(12) United States Patent
Watanabe et al.

(10) Patent No.: US 8,284,274 B2
(45) Date of Patent: Oct. 9, 2012

(54) IMAGE PICKUP APPARATUS PROVIDED WITH ZOOM LENS

(75) Inventors: Masahito Watanabe, Hachioji (JP); Tomoyuki Satori, Kawagoe (JP)

(73) Assignee: Olympus Imaging Corp., Tokyo (JP)

( * ) Notice: Subject to any disclaimer, the term of this patent is extended or adjusted under 35 U.S.C. 154(b) by 594 days.

(21) Appl. No.: 12/381,032

(22) Filed: Mar. 6, 2009

(65) Prior Publication Data

US 2009/0225198 A1 Sep. 10, 2009

(30) Foreign Application Priority Data

Mar. 10, 2008 (JP) ................................ 2008-059910

(51) Int. Cl.
*H04N 5/262* (2006.01)

(52) U.S. Cl. .................................................... 348/240.3

(58) Field of Classification Search ............... 348/240.3; 359/704

See application file for complete search history.

(56) References Cited

U.S. PATENT DOCUMENTS

| | | | |
|---|---|---|---|
| 4,818,083 A * | 4/1989 | Mihara | 359/687 |
| 5,579,171 A * | 11/1996 | Suzuki et al. | 359/687 |
| 5,790,316 A | 8/1998 | Terasawa et al. | |
| 5,978,160 A | 11/1999 | Koiwai et al. | |
| 6,324,019 B1 * | 11/2001 | Takanashi et al. | 359/704 |
| 2005/0018280 A1 * | 1/2005 | Richardson | 359/368 |
| 2005/0073751 A1 * | 4/2005 | Mihara | 359/680 |
| 2008/0049337 A1 * | 2/2008 | Kamo | 359/797 |
| 2010/0232032 A1 * | 9/2010 | Sato | 359/683 |

FOREIGN PATENT DOCUMENTS

| | | |
|---|---|---|
| JP | 7-294814 | 11/1995 |
| JP | 10-160994 | 6/1998 |
| JP | 2001-350089 | 12/2001 |

\* cited by examiner

*Primary Examiner* — Clayton E Laballe
*Assistant Examiner* — Noam Reisner
(74) *Attorney, Agent, or Firm* — Kenyon & Kenyon LLP

(57) ABSTRACT

An image pickup apparatus, which comprises, in order from the object side, an aperture member having an opening section, a zoom lens changing a magnification by properly changing distances between a plurality of lens units, and an image pickup device, is provided with a flare stop which has an opening section with a set shape and is integrated with the most object side lens unit in the plurality of the lens units, the opening section of the aperture member does not intercept an effective light beam in the wide-angle position and intercepts a part of the effective light beam in the telephoto position, and the flare stop does not intercept in the wide-angle position the effective light beam having passed through the opening section of the aperture member and intercepts in the telephoto position a light ray which is included in the effective light beam passing through the opening section of the aperture member and strikes the edge of the opening section of the aperture member to be scattered.

16 Claims, 11 Drawing Sheets

EMBODIMENT 1

EMBODIMENT 1

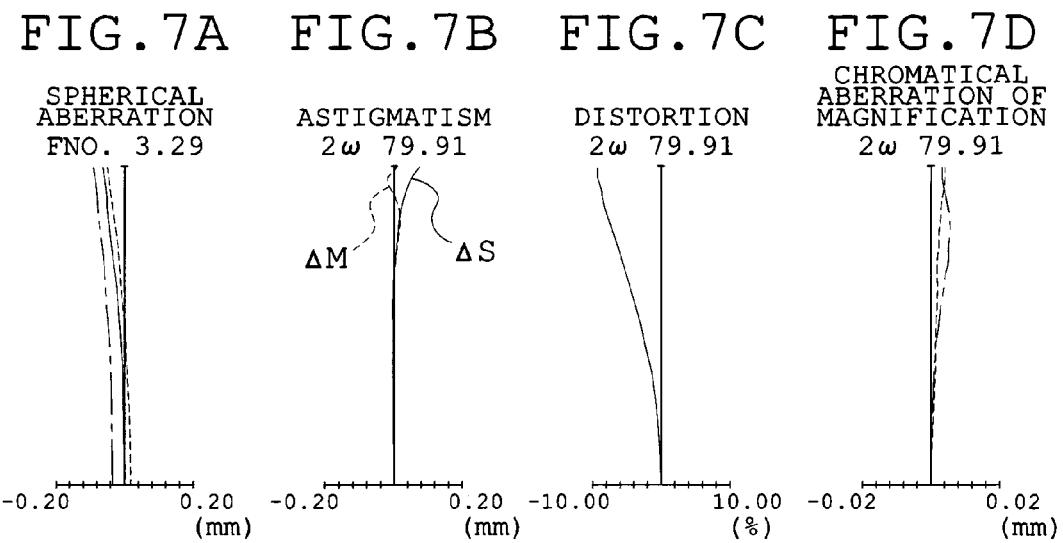

FIG. 7A — SPHERICAL ABERRATION FNO. 3.29
FIG. 7B — ASTIGMATISM 2ω 79.91
FIG. 7C — DISTORTION 2ω 79.91
FIG. 7D — CHROMATICAL ABERRATION OF MAGNIFICATION 2ω 79.91

FIG. 7E — SPHERICAL ABERRATION FNO. 5.49
FIG. 7F — ASTIGMATISM 2ω 27.16
FIG. 7G — DISTORTION 2ω 27.16
FIG. 7H — CHROMATICAL ABERRATION OF MAGNIFICATION 2ω 27.16

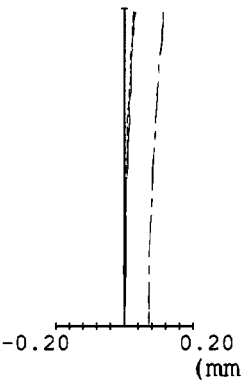
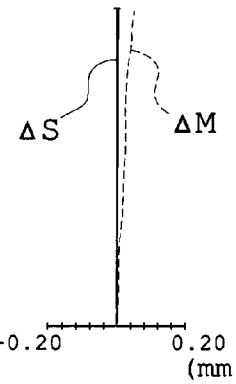
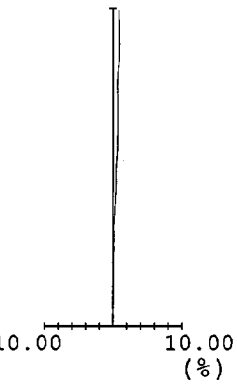
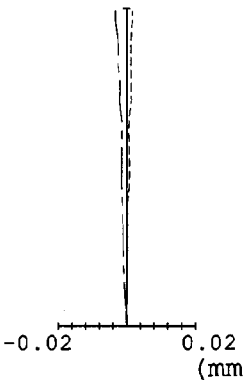

FIG. 7I — SPHERICAL ABERRATION FNO. 6.00
FIG. 7J — ASTIGMATISM 2ω 9.03
FIG. 7K — DISTORTION 2ω 9.03
FIG. 7L — CHROMATICAL ABERRATION OF MAGNIFICATION 2ω 9.03

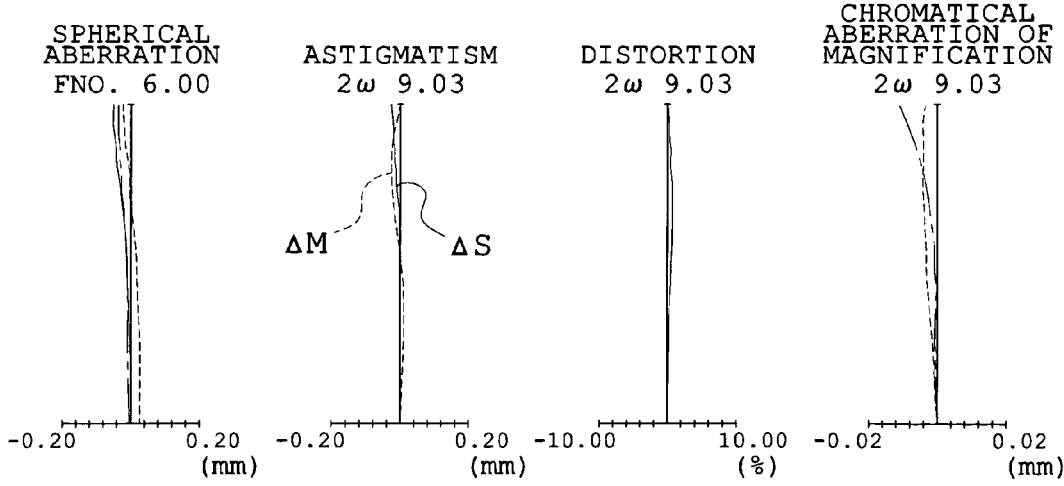

435.84 —·—  656.27  587.56 ———

EMBODIMENT 1

EMBODIMENT 2

EMBODIMENT 2

EMBODIMENT 2

IMAGE PICKUP APPARATUS PROVIDED WITH ZOOM LENS

This application claims benefits of Japanese Patent Application NO. 2008-59910 filed in Japan on Mar. 10, 2008, the contents of which are hereby incorporated by reference.

BACKGROUND OF THE INVENTION

1. Field of the Invention

This invention relates to an image pick up apparatus provided with a zoom lens that is used for digital still cameras or digital video cameras (which are hereinafter generically called digital cameras).

2. Description of the Related Art

Digital cameras, which are provided with a zoom lens having a variable magnification of about 5 to 7 and a solid-state image pickup device such as CCD (Charge Coupled Device) or CMOS (Complementary Metal-Oxide Semiconductor), have been often popularized in recent years. Such digital cameras also have been miniaturized in recent years so that the digital cameras can be put well in a pocket of clothes or bags and are portable, because a desire for a user to easily enjoy photography has increased more and more.

Such digital cameras provided with a zoom lens include a well known digital camera which has a barrier mechanism for protecting a lens in the idle digital camera and in which the barrier mechanism is placed on the object side of the zoom lens. In addition, such digital cameras provided with a zoom lens also include a digital camera which has a flare stop in the zoom lens in order to intercept scattered light causing flare or ghost. Zoom lenses, which are disclosed in Japanese Patent Kokai Hei NO. 7-294814 or Hei NO. 10-160994, or Japanese Patent Kokai NO. 2001-358009, are known as such zoom lenses having a flare stop.

SUMMARY OF THE INVENTION

An image pickup apparatus according to the present invention is characterized in that: the image pickup apparatus comprises, in order from the object side, an aperture member having an opening section, a zoom lens changing a magnification by properly changing distances between a plurality of lens units, and an image pickup device; a flare stop, which has an opening section having a set shape, is integrated with the most object side lens unit in the plurality of the lens units; the opening section of the aperture member does not intercept an effective light beam in a wide-angle position, and intercepts a part of the effective light beam in a telephoto position; and the flare stop does not intercept the effective light beam having passed through the opening section of the aperture member in the wide-angle position, and intercepts a light ray which is included in the effective light beam having passed through the opening section and strikes the edge of the opening section of the aperture member to be scattered, in the telephoto position.

In the image pickup apparatus according to the present invention, the opening section of the aperture member, the opening section of the flare stop, and the effective image pickup area of the image pickup device preferably have an approximately rectangular shape and preferably satisfy the following condition (1):

$$(X_A/Y_A)/(X_F/Y_F) < 1.10 \tag{1}$$

where X-direction corresponds to the longitudinal direction of the effective image pickup area of the image pickup device, Y-direction corresponds to the direction perpendicular to the longitudinal direction of the effective image pickup area of the image pickup device, $X_A$ denotes the maximum value of the X-direction of the opening section of the aperture member, $Y_A$ denotes the maximum value of the Y-direction of the opening section of the aperture member, $X_F$ denotes the maximum value of the X-direction of the opening section of the flare stop, and $Y_F$ denotes the maximum value of the Y-direction of the opening section of the flare stop.

In the image pickup apparatus according to the present invention, the opening section of the aperture member, the opening section of the flare stop, and the effective image pickup area of the image pickup device preferably have an approximately rectangular shape and preferably satisfy the following condition (2):

$$(X_I/Y_I)/(X_F/Y_F) < 1.10 \tag{2}$$

where X-direction corresponds to the longitudinal direction of the effective image pickup area of the image pickup device, Y-direction corresponds to the direction perpendicular to the longitudinal direction of the effective image pickup area of the image pickup device, $X_I$ denotes the maximum value of the X-direction of the effective image pickup area of the image pickup device, $Y_I$ denotes the maximum value of the Y-direction of the effective image pickup area of the image pickup device, $X_F$ denotes the maximum value of the X-direction of the opening section of the flare stop, and $Y_F$ denotes the maximum value of the Y-direction of the opening section of the flare stop.

In the image pickup apparatus according to the present invention, the zoom lens preferably comprises, in order from the object side, a first lens unit with positive refractive power, a second lens unit with negative refractive power, an aperture stop, and a third lens unit with positive refractive power, the image pickup device is preferably a solid-state image pickup device, the flare stop and the first lens unit preferably move integrally with each other in changing a magnification, and the image pickup apparatus according to the present invention preferably satisfies the following conditions (3) and (4):

$$0.5 < fw/D < 1 \tag{3}$$

$$4.5 < ft/fw < 50 \tag{4}$$

where fw denotes a focal length in the wide-angle position of the zoom lens, ft denotes a focal length in the telephoto position of the zoom lens, and D denotes a length of the diagonal line of the solid-state image pickup device.

In the image pickup apparatus according to the present invention, it is preferable that the aperture member and the flare stop do not intercept a principal ray of the maximum image height in the effective light beam in the telephoto position.

In the image pickup apparatus according to the present invention, distortion is preferably corrected by image processing.

The present invention is capable of offering a miniature image pickup apparatus which comprises an aperture member, a flare stop, and a zoom lens and by which a bright image is obtained with a small flare or ghost in spite of the image pickup apparatus which is of wide-angle and high variable magnification.

These and other features and advantages of the present invention will become apparent from the following detailed description of the preferred embodiments when taken in conjunction with accompanying drawings.

BRIEF DESCRIPTION OF THE DRAWINGS

FIGS. 7A-7D, 7E-7H, and 7I-7L are diagrams showing aberration characteristics in wide-angle, middle, and telephoto positions, respectively, in infinite objective point focusing of the image pickup apparatus which has the zoom lens shown in FIG. 6A-6C.

DETAILED DESCRIPTION OF THE PREFERRED EMBODIMENTS

Before undertaking the description of the embodiments of an image pickup apparatus according to the present invention, the function and effect caused by each constitution of an image pickup apparatus according to the present invention will be explained.

The present invention supposes that an image pickup apparatus according to the present invention comprises, in order from the object side, an aperture member having an opening section, a zoom lens changing a magnification by properly changing distances between a plurality of lens units, and an image pickup device.

Figure 1A:
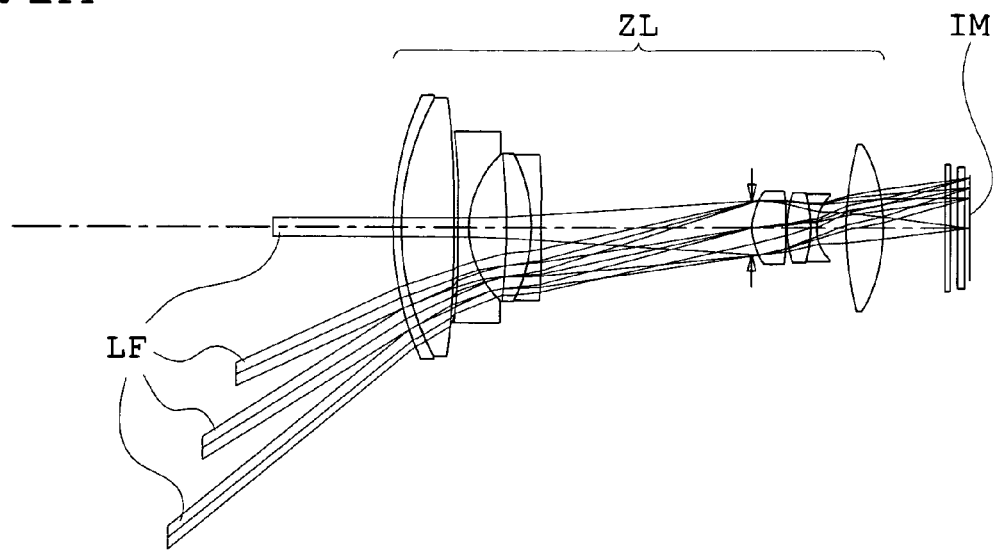
FIGS. 1A, 1B, and 1C are cross sectional views showing arrangements, developed along the optical axis, in wide-angle, middle, and telephoto positions, respectively, in infinite object point focusing of the zoom lens which is of wide-angle and high variable magnification.
Figure 1B:
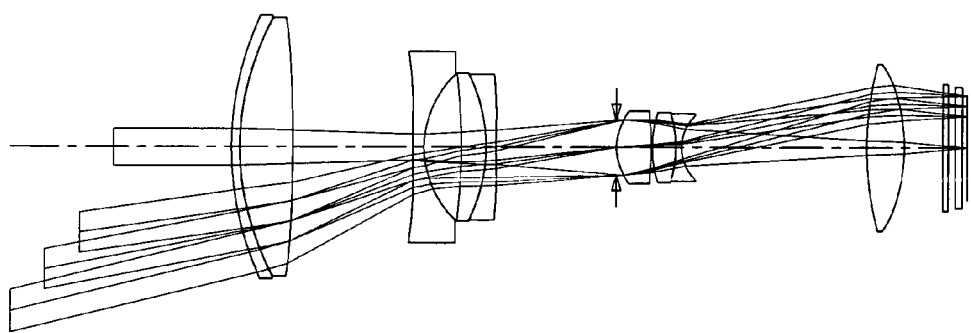
Figure 1C:
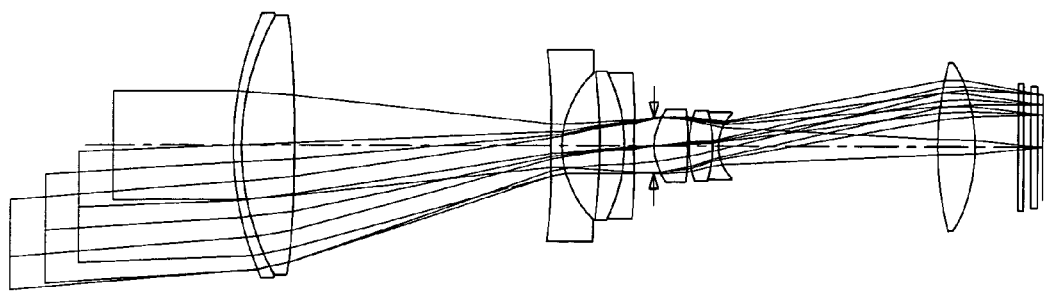
Figure 2A:
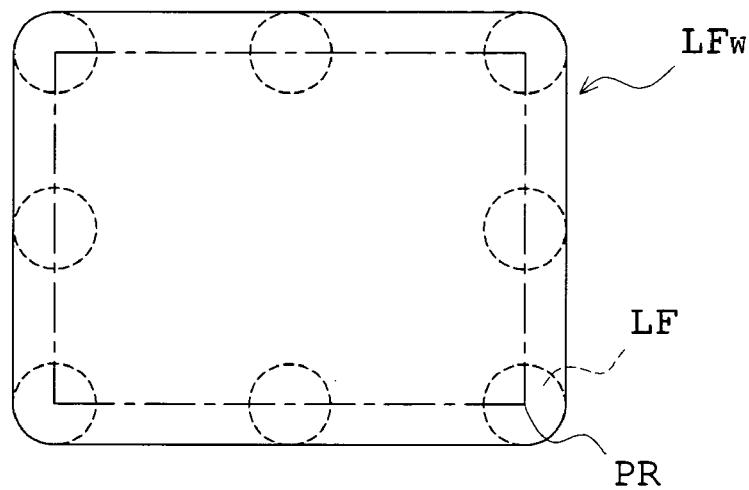
FIGS. 2A and 2B are diagrams showing a cross sectional shape of an effective light beam which forms an image on an imaging plane through the zoom lens shown in FIG. 1A-1C, in the most object side lens surface in the zoom lens, in wide-angle and telephoto positions, respectively.
Figure 2B:
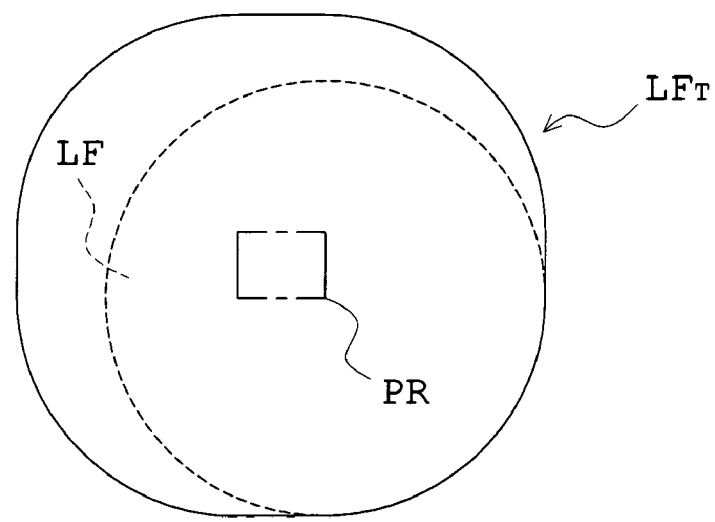

First, when an conventional image pickup apparatus is designed to be of wide-angle and high variable magnification like an image pickup apparatus according to the present invention, a light beam which is incident on a zoom lens of the conventional image pickup apparatus will be explained using FIGS. 1A, 1B, and 1C and FIGS. 2A and 2B. FIGS. 1A, 1B, and 1C are cross sectional views showing arrangements, developed along the optical axis, in infinite object point focusing of the zoom lens which is of wide-angle and high variable magnification. FIG. 1A corresponds to the case when the image pickup apparatus is in wide-angle position, FIG. 1B corresponds to the case when the image pickup apparatus is in the middle position, and FIG. 1C corresponds to the case when the image pickup apparatus is in the telephoto position. FIGS. 2A and 2B are diagrams showing a cross sectional shape of an effective light beam which forms an image on an imaging plane through the zoom lens shown in FIG. 1A-1C, in the most object side lens surface in the zoom lens. FIG. 2A shows the cross sectional shape in the most object side lens surface in the zoom lens in the case when the image pickup apparatus is in the wide-angle position, and FIG. 2B shows the cross sectional shape in the most object side lens surface in the zoom lens in the case when the image pickup apparatus is in the telephoto position.

An image pickup device which has an imaging plane IM having a rectangular effective image pickup area is placed on the image side of the zoom lens ZL which is of wide-angle and high variable magnification and is shown in FIGS. 1A, 1B, and 1C. As shown in FIGS. 1A, 1B, and 1C, a diameter of each light beam LF which forms an image on the imaging plane IM in the telephoto position is considerably larger than a diameter of the light beam LF in the wide-angle position in the case when the zoom lens ZL is of wide-angle and high variable magnification.

For this reason, the cross sectional shape of an effective light beam that is formed by light beams LF which are included in light beams incident on the object side surface of the most object side lens in the zoom lens ZL and are finally incident on the effective image pickup area of the imaging plane IM becomes an a approximately rectangular shape $LF_W$ in wide-angle position as shown in FIG. 2A and becomes an a approximately circular shape $LF_T$ in telephoto position as shown in FIG. 2B. A rectangle drawn by a dot-and-dash line in the cross sectional shape of each effective light beam is made by connecting principal rays PR of the most outside light beams in light beams forming an effective light beam.

As described above, the more a zoom lens has wide-angle characteristics and the higher a variable magnification ratio of the zoom lens is, the more remarkably different the shape and size of an effective light beam in the wide-angle position are from the shape and size of an effective light beam in the telephoto position. For this reason, when a zoom lens used for an image pickup apparatus is of wide-angle and high variable magnification, it is difficult to remove flare or ghost with sufficient amount of light being secured and to realize downsizing of whole of the apparatus even though the zoom lens is provided with a barrier mechanism or a flare stop.

In order to solve such problems, an image pickup apparatus according to the present invention is designed in such a way that: the opening section of the aperture member does not intercept an effective light beam in the wide-angle position and intercepts a part of the effective light beam in the telephoto position; and the flare stop does not intercept the effective light beam having passed through the opening section of the aperture member in the wide-angle position and intercepts a light ray which is included in the effective light beam having passed through the opening section of the aperture member and strikes the edge of the opening section of the aperture member to be scattered, in the telephoto position.

Figure 3A:
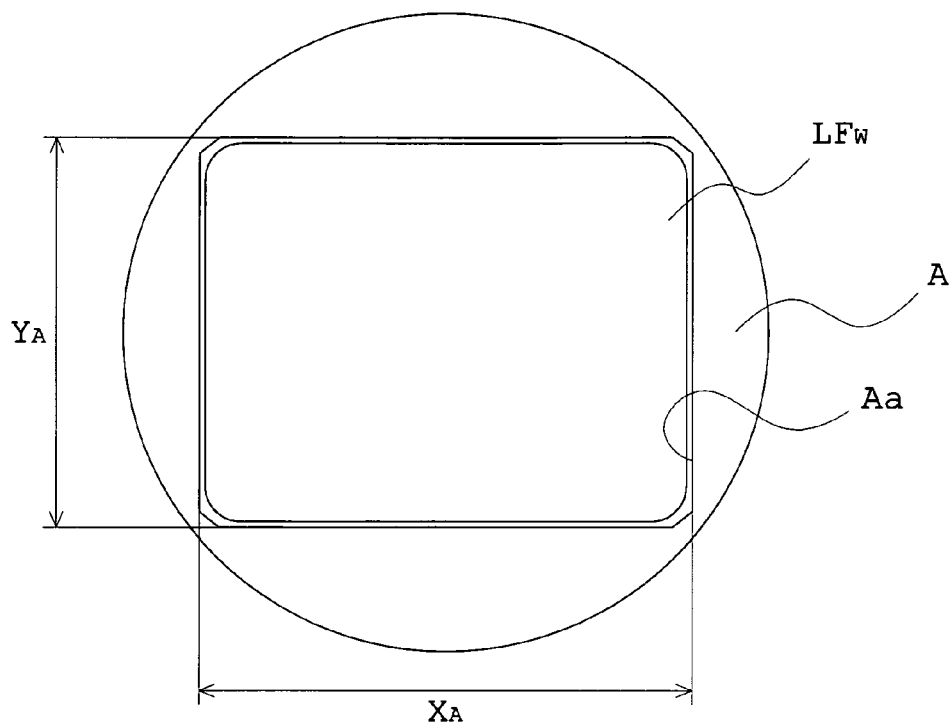
FIGS. 3A and 3B are diagrams showing an aperture member for an image pickup apparatus according to the present invention and an area of an effective light beam which is intercepted by the aperture member in wide-angle and telephoto positions, respectively.
Figure 3B:
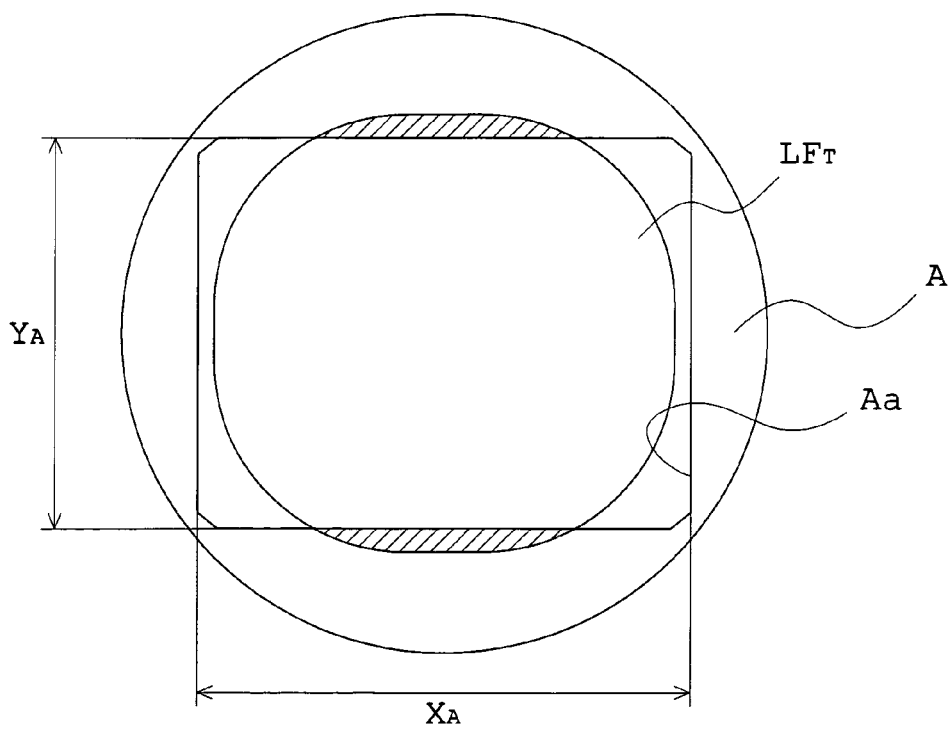
Figure 4A:
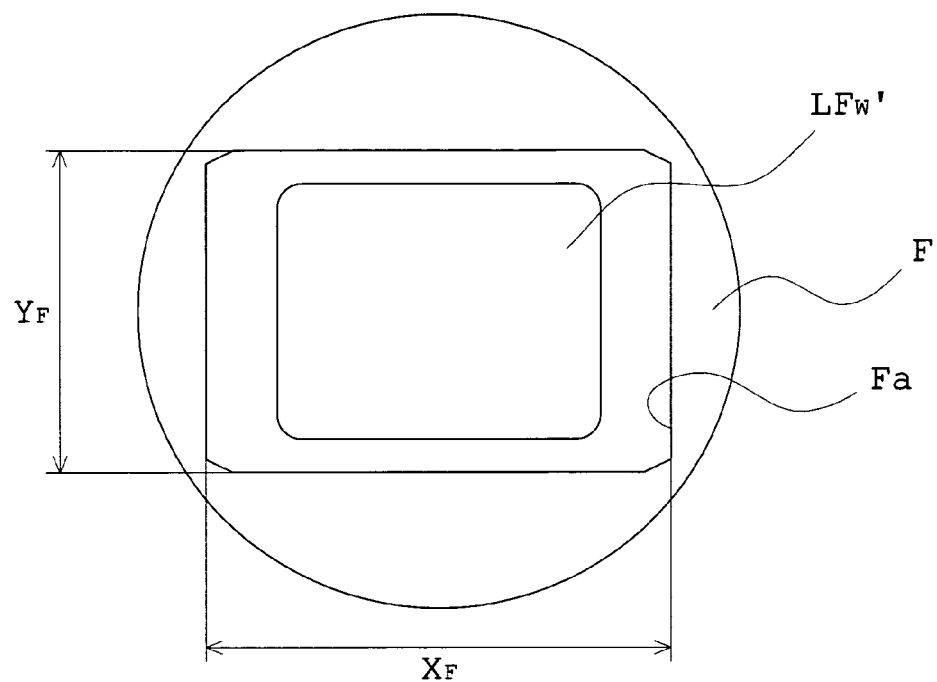
FIGS. 4A and 4B are diagrams showing a flare stop for an image pickup apparatus according to the present invention and an area of an effective light beam which is intercepted by the flare stop in wide-angle and telephoto positions, respectively.
Figure 4B:
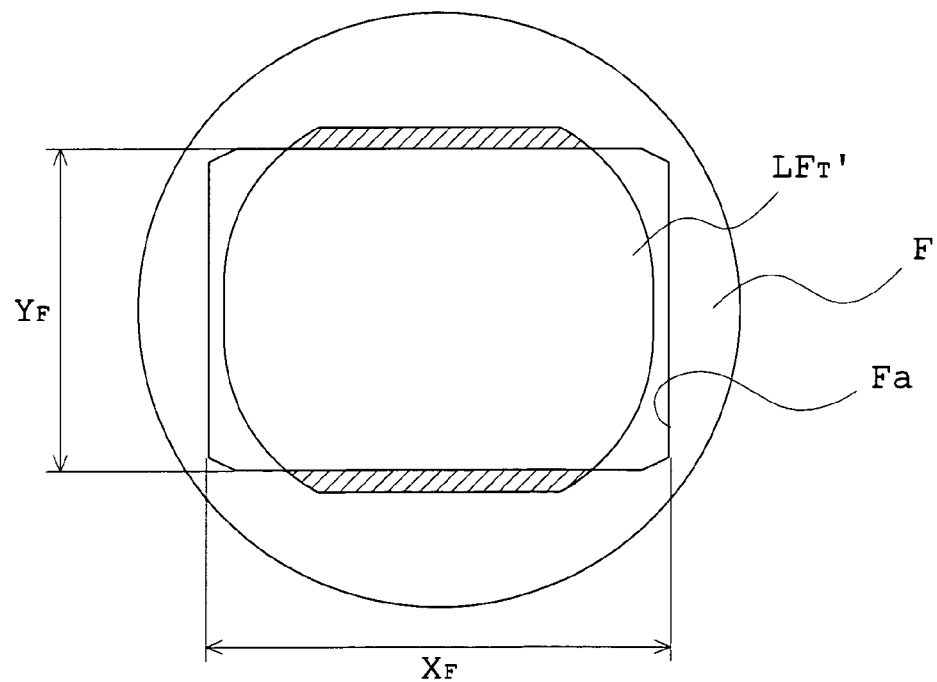

An aperture member and a flare stop for an image pickup apparatus according to the present invention will be explained using FIGS. 3A, 3B, 4A, and 4B. FIGS. 3A and 3B are diagrams showing an aperture member for an image pickup apparatus according to the present invention and an area of an effective light beam which is intercepted by the aperture member, FIG. 3A corresponds to the case when the image pickup apparatus is in the wide-angle position, and FIG. 3B corresponds to the case when the image pickup apparatus is in the telephoto position. FIGS. 4A and 4B are diagrams showing a flare stop for an image pickup apparatus according to the present invention and an area of an effective light beam which is intercepted by the flare stop, FIG. 4A corresponds to the case when the image pickup apparatus is in the wide-angle position, and FIG. 4B corresponds to the case when the image pickup apparatus is in the telephoto position. The intercepted areas of the effective light beam shown in FIGS. 3A, 3B, 4A and 4B are drawn by hatching. If a component shown in FIGS. 3A, 3B, 4A and 4B is also shown in FIGS. 1A, 1B, 2A, and 2B, the component is given the same reference letter as the component is given in FIGS. 1A, 1B, 2A, and 2B.

It is desirable that a barrier mechanism which is placed on the objective side of a zoom lens is small with a space for storing a vane in a use of a digital camera being secured. For this reason, it is desirable that an opening section which is formed in an aperture member of the barrier mechanism is as small as possible.

An opening section $A_a$ of an aperture member A for the present invention transmits all effective light beam $LF_W$ in the wide-angle position as shown in FIG. 3A. For this reason, scattered light which causes flare or ghost does not occur in the opening section $A_a$ and amount of ambient light of an obtained image can be also sufficiently secured. On the other hand, scattered light which causes flare or ghost occurs on the edge of the opening section $A_a$ in the telephoto position as shown in FIG. 3B, because a part of the effective light beam $LF_T$ is intercepted. However, sufficient amount of ambient light can be secured and the present invention can realize downsizing of the whole of the apparatus.

An opening section $F_a$ of a flare stop F for the present invention transmits all effective light beam $LF_W'$ having passed through the opening section $A_a$ of an aperture member A as shown in FIG. 4A. For this reason, amount of ambient light of an obtained image can be sufficiently secured like the aperture member A. In addition, flare or ghost which is caused by reflection on the edge of the opening section $A_a$ of the aperture member A does not occur because scattered light which causes flare or ghost does not occur in the aperture member A. On the other hand, as shown in FIG. 4B, in the telephoto position, occurrence of flare or ghost can be prevented to an image obtained in an image pickup device because the flare stop F furthermore intercepts a part of an effective light beam $LF_T'$ a part of which is intercepted by the opening section $A_a$ of an aperture member A, which includes scattered light causing flare or ghost. In addition, although amount of ambient light decrease in a part of an obtained image because the part of the effective light beam is furthermore intercepted, sufficient amount of ambient light can be secured as a whole because a diameter of each light beam forming the effective light beam is large.

Accordingly, it is possible to sufficiently secure amount of ambient light for an obtained image both in the wide-angle position and in the telephoto position and to remove ghost and flare, because an image pickup apparatus according to the present invention has both aperture member and flare stop which have such characteristic opening section. An image pickup apparatus according to the present invention is designed in such a way that: the flare stop F is provided integrally with the first lens unit and between the aperture member and the second lens unit; and the opening section $F_a$ has a set shape and does not change the shape.

Such zoom lens as is used for an image pickup apparatus which the present invention supposes is such that a shape of an effective light beam incident on the zoom lens changes into a shape near to the shape of an image pickup device (in general, approximately rectangular shape) both in the wide-angle position and in the telephoto position as the light beam approaches the image pickup device. For this reason, if the flare stop is placed at a position which is too near to the image pickup device, it becomes difficult to intercept a part of the effective light beam only in the telephoto position. For this reason, in the present invention, the flare stop is provided integrally with the first lens unit. In addition, a part of the light beam can be intercepted only in the telephoto position without changing a shape of the opening section of the flare stop because the flare stop is placed at such position. For this reason, an image pickup apparatus needs no mechanism for changing a shape of the opening section of the flare stop and no mechanism for independently moving the flare stop in changing a magnification, and downsizing of the whole of the apparatus can be easily realized.

An image pickup apparatus according to the present invention is preferably designed in such a way that the opening section of the aperture member, the opening section of the flare stop, and the effective image pickup area of the image pickup device have an approximately rectangular shape and satisfy the following condition (1):

$$(X_A/Y_A)/(X_F/Y_F)<1.10 \tag{1}$$

where X-direction corresponds to the longitudinal direction of the effective image pickup area of the image pickup device, Y-direction corresponds to the direction perpendicular to the longitudinal direction of the effective image pickup area of the image pickup device, $X_A$ denotes the maximum value of the X-direction of the opening section of the aperture member, $Y_A$ denotes the maximum value of the Y-direction of the opening section of the aperture member (see FIGS. 3A and 3B), $X_F$ denotes the maximum value of the X-direction of the opening section of the flare stop, and $Y_F$ denotes the maximum value of the Y-direction of the opening section of the flare stop (see FIGS. 4A and 4B). If $(X_A/Y_A)/(X_F/Y_F)$ is beyond the upper limit of the condition (1), scattered light which is caused by a part of an effective light beam striking the edge of the opening section of the aperture member is liable to pass through the flare stop to come to the image pickup device. In addition, amount of ambient light cannot be sufficiently secured in the diagonal direction of the image surface because the intercepted area of the light beam in the flare stop becomes too large.

The image pickup apparatus according to the present invention is more preferably designed to satisfy the following condition (1)' or (1)'' instead of the condition (1):

$$0.3<(X_A/Y_A)/(X_F/Y_F)<1.05 \tag{1'}$$

$$0.6<(X_A/Y_A)/(X_F/Y_F)<1.02 \tag{1''}$$

In addition, the upper limit or lower limit of the condition (1)' may be replaced with the upper limit or lower limit of the condition (1) or (1)'', respectively. The upper limit or lower limit of the condition (1)'' may be replaced with the upper limit or lower limit of the condition (1) or (1)', respectively.

The Image pickup apparatus according to the present invention is preferably designed in such a way that the opening section of the aperture member, the opening section of the flare stop, and the effective image pickup area of the image pickup device have an approximately rectangular shape and satisfy the following condition (2):

$$(X_I/Y_I)/(X_F/Y_F)<1.10 \quad (2)$$

where X-direction corresponds to the longitudinal direction of the effective image pickup area of the image pickup device, Y-direction corresponds to the direction perpendicular to the longitudinal direction of the effective image pickup area of the image pickup device, $X_I$ denotes the maximum value of the X-direction of the effective image pickup area of the image pickup device, $Y_I$ denotes the maximum value of the Y-direction of the effective image pickup area of the image pickup device, $X_F$ denotes the maximum value of the X-direction of the opening section of the flare stop, and $Y_F$ denotes the maximum value of the Y-direction of the opening section of the flare stop (see FIGS. 4A and 4B). If $(X_I/Y_I)/(X_F/Y_F)$ is beyond the upper limit of the condition (2), scattered light which is caused by a part of an effective light beam striking the edge of the opening section of the aperture member is liable to pass through the flare stop to come to the image pickup device. In addition, amount of light on the periphery of the image surface cannot be sufficiently secured because the intercepted area of the light beam in the flare stop becomes too large.

The image pickup apparatus according to the present invention is more preferably designed to satisfy the following condition (2)' or (2)" instead of the condition (2):

$$0.3<(X_I/Y_I)/(X_F/Y_F)<1.05 \quad (2)'$$

$$0.6<(X_I/Y_I)/(X_F/Y_F)<1.03 \quad (2)''$$

In addition, the upper limit or lower limit of the condition (2)' may be replaced with the upper limit or lower limit of the condition (2) or (2)", respectively. The upper limit or lower limit of the condition (2)" may be replaced with the upper limit or lower limit of the condition (2) or (2)', respectively.

The image pickup apparatus according to the present invention is preferably designed in such a way that: the zoom lens comprises, in order from the object side, a first lens unit with positive refractive power, a second lens unit with negative refractive power, an aperture stop, and a third lens unit with positive refractive power; the image pickup device is a solid-state image pickup device; the flare stop and the first lens unit move integrally with each other in changing a magnification; and the image pickup apparatus according to the present invention satisfies the following conditions (3) and (4):

$$0.5<fw/D<1 \quad (3)$$

$$4.5<ft/fw<50 \quad (4)$$

where fw denotes a focal length in the wide-angle position of the zoom lens, ft denotes a focal length in the telephoto position of the zoom lens, and D denotes a length of the diagonal line of the solid-state image pickup device. If fw/D is beyond the upper limit of the condition (3), it is hard to give the image pickup apparatus wide-angle and high variable magnification capabilities. On the other hand, if fw/D is below the lower limit of the condition (3), the size of the zoom lens in the direction of the diameter of the zoom lens becomes large in spite of the constitution satisfying the condition (2) and it is hard to downsize the image pickup apparatus, because the difference between the height of a light ray passing through the edge of the opening section of the aperture member and the effective diameter of the first lens unit becomes too large.

The image pickup apparatus according to the present invention is more preferably designed to satisfy the following condition (3)' or (3)" instead of the condition (3):

$$0.3<fw/D<0.9 \quad (3)'$$

$$0.6<fw/D<0.8 \quad (3)''$$

In addition, the upper limit or lower limit of the condition (3)' may be replaced with the upper limit or lower limit of the condition (3) or (3)", respectively. The upper limit or lower limit of the condition (3)" may be replaced with the upper limit or lower limit of the condition (3) or (3)', respectively. If ft/fw is beyond the upper limit of the condition (4), it is hard to secure a sufficient image quality over the total zoom range. On the other hand, if ft/fw is below the lower limit of the condition (4), it is impossible to design a high variable magnification zoom lens.

The image pickup apparatus according to the present invention is more preferably designed to satisfy the following condition (4)' or (4)" instead of the condition (4):

$$5.5<ft/fw<30 \quad (4)'$$

$$8.5<ft/fw<25 \quad (4)''$$

In addition, the upper limit or lower limit of the condition (4)' may be replaced with the upper limit or lower limit of the condition (4) or (4)", respectively. The upper limit or lower limit of the condition (4)" may be replaced with the upper limit or lower limit of the condition (4) or (4)', respectively.

The image pickup apparatus according to the present invention is preferably designed in such a way that the aperture member and the flare stop do not intercept a principal ray of the maximum image height in the effective light beam in the telephoto position.

Such design makes it possible to detect the principal ray of an off-axis light beam on the image pickup device also in the telephoto position.

The image pickup apparatus according to the present invention is preferably designed in such a way that distortion is corrected by image processing.

Large and negative distortion is easy to occur in the wide-angle position because distortion is liable to become large in the wide-angle position. In this case, although an effective light beam may be restricted in the wide-angle position by forming the opening section of the aperture member into a pin-cushion shape, it becomes difficult to make the aperture member. On the other hand, it is easy to make the aperture member because the shape of the opening section of the aperture member can be approximately rectangular when distortion is corrected by image processing.

Figure 5A:
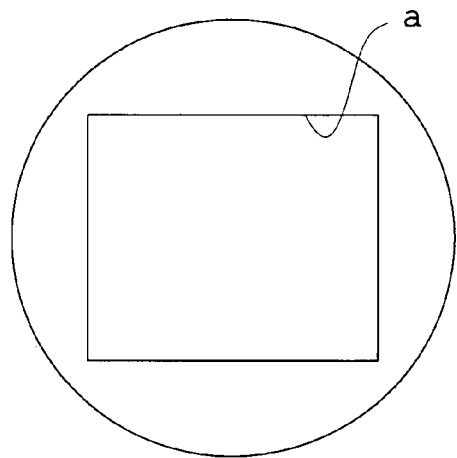
FIGS. 5A, 5B, and 5C are diagrams showing different examples of a shape of the opening section of the flare stop for the present invention.
Figure 5B:
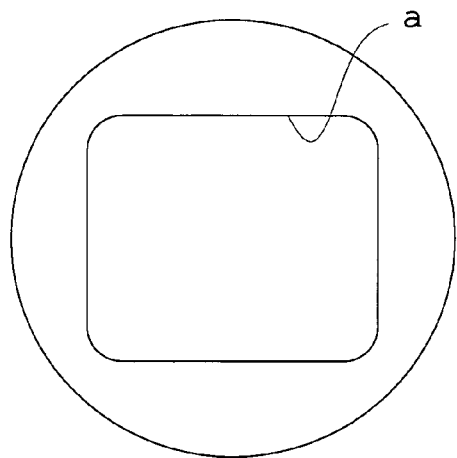
Figure 5C:
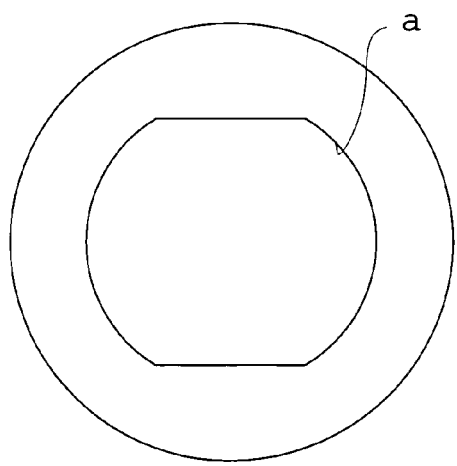

The shapes of opening sections of the aperture member and flare stop will be explained. FIGS. 5A, 5B, and 5C are diagrams showing examples of a shape of the opening section of the flare stop. FIG. 5A shows a flare stop having an opening section a that is formed into a rectangle without cutting its four corners, FIG. 5B shows a flare stop having an opening section a that is formed into an approximate rectangle whose four corners are rounded off, and FIG. 5C shows a flare stop having an opening section a that is formed into an approximate rectangle in which the sides of one of pairs of the two sides facing to each other are curved. The opening sections of the aperture member and the flare stop are approximately rectangular as shown in FIGS. 3A, 3B, 4A, and 4B. However, practically, the opening sections may be formed into an octagon whose four corners are slightly cut off, or into a shape as shown in FIGS. 5A, 5B, and 5C.

The embodiments 1 and 2 of an optical system according to the present invention will be explained below with the diagrams referred to. Subscript numerals in $r_1, r_2, \ldots$ and $d_1, d_2, \ldots$ in cross sectional views of the optical systems correspond to surface numbers, 1, 2, ... in numerical data, respectively. In views showing aberration curves, $\Delta M$ in views of astigmatism denotes astigmatism in a meridional surface, and $\Delta S$ in views of astigmatism denotes astigmatism in a sagittal surface. In this case, the meridional surface is a surface which includes the optical axis of an optical system and a principal ray (, or a surface parallel to the surface of a paper sheet), and the sagittal surface is a surface perpendicular to a surface which includes the optical axis of an optical system and a principal ray (, or a surface perpendicular to the surface of a paper sheet).

In the numerical data to lenses in each of the following embodiments, s denotes a surface number, R denotes the radius of curvature of each surface, D denotes spacing between the surfaces, Nd denotes the refractive index relating to the d line, νd denotes the Abbe's number relating to the d line, K denotes a conic constant, and $A_4, A_6, A_8, A_{10},$ and $A_{12}$ denote an aspherical coefficient. In addition, the configuration of each aspherical surface is expressed by the following equation with aspherical coefficients for each embodiment:

$$Z=(Y^2/r)/[1+\{1-(1+K)(Y/r)^2\}^{1/2}]+A_4Y^4+A_6Y^6+A_8Y^8+A_{10}Y^{10}+A_{12}Y^{12}+\ldots$$

where, Z is taken as a coordinate in the direction along the optical axis, and Y is taken as a coordinate in the direction perpendicular to the optical axis.

First Embodiment

Figure 6A:
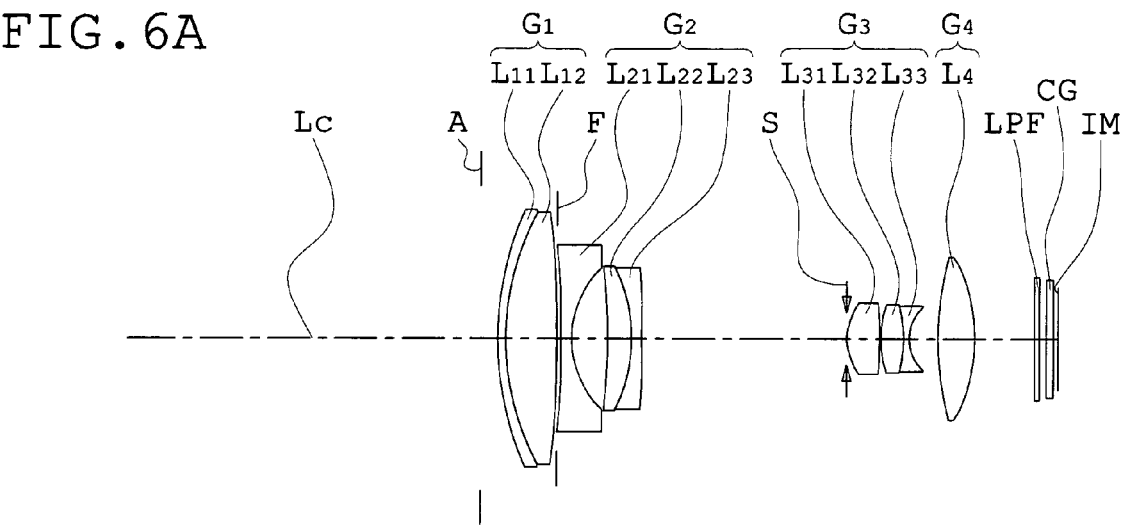
FIGS. 6A, 6B, and 6C are cross sectional views showing arrangements, developed along the optical axis, in wide-angle, middle, and telephoto positions, respectively, in infinite object point focusing of the zoom lens for a first embodiment of an image pickup apparatus according to the present invention.
Figure 6B:
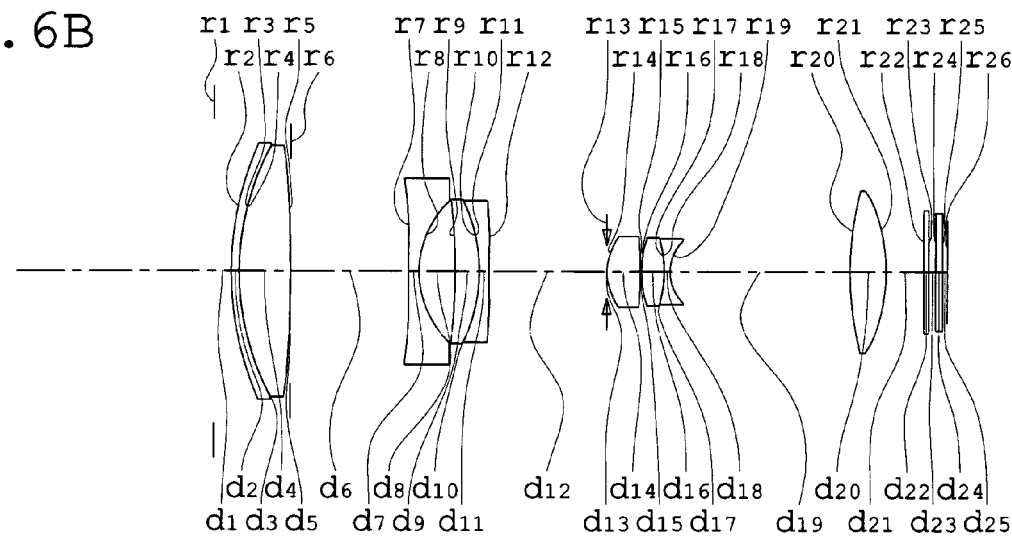
Figure 6C:
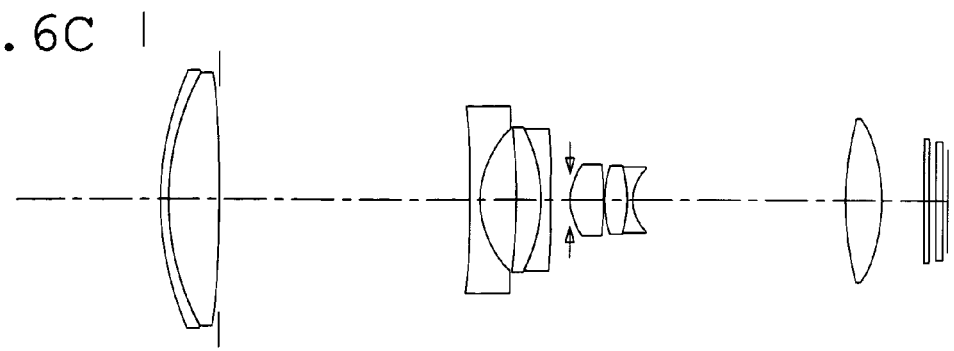
Figure 8A:
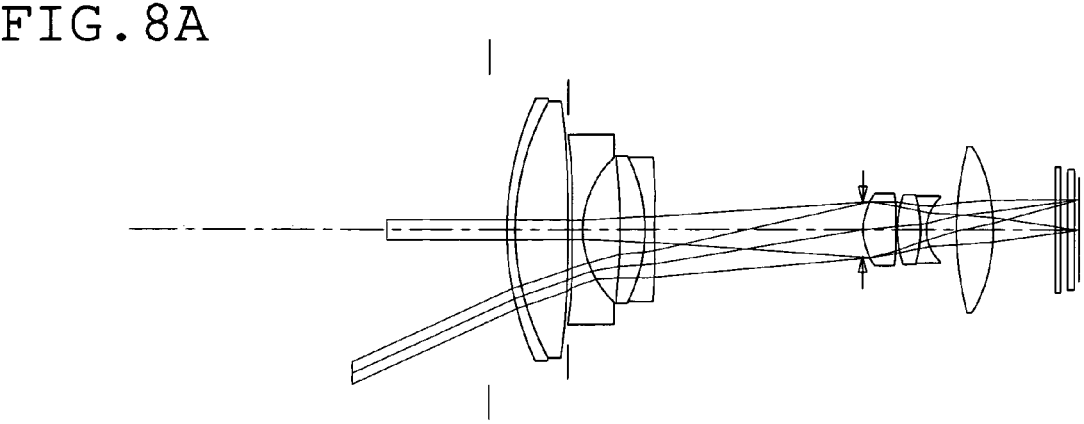
FIGS. 8A, 8B, and 8C are diagrams showing optical paths in the zoom lens shown in FIGS. 6A-6C, and FIGS. 7A-7D, 7E-7H, and 7I-7L in wide-angle, middle, and telephoto positions, respectively.
Figure 8B:
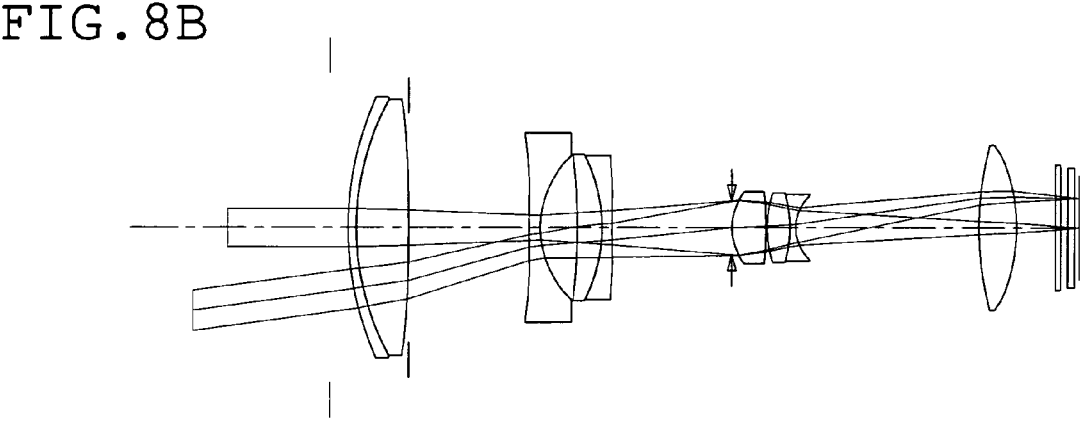
Figure 8C:
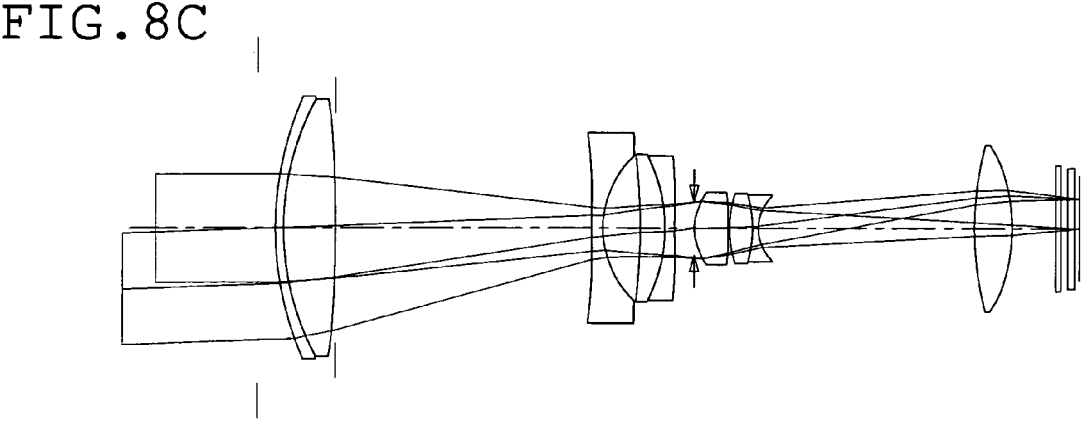

FIGS. 6A, 6B, and 6C are cross sectional views showing arrangements, developed along the optical axis, in infinite object point focusing of the zoom lens for the first embodiment of an image pickup apparatus according to the present invention. FIG. 6A corresponds to the case when the image pickup apparatus is in the wide-angle position, FIG. 6B corresponds to the case when the image pickup apparatus is in the middle position and FIG. 6C corresponds to the case when the image pickup apparatus is in the telephoto position. FIGS. 7A-7D, 7E-7H, and 7I-7L are diagrams showing aberration characteristics in infinite objective point focusing of the image pickup apparatus which has the zoom lens shown in FIG. 6A-6C. FIG. 7A-7D correspond to the case when the image pickup apparatus is in the wide-angle position, FIG. 7E-7H correspond to the case when the image pickup apparatus is in the middle position, and FIG. 7I-7L correspond to the case when the image pickup apparatus is in the telephoto position. FIGS. 8A, 8B, and 8C are diagrams showing optical paths in the zoom lens shown in FIGS. 6A-6C, and FIGS. 7A-7D, 7E-7H, and 7I-7L. FIG. 8A corresponds to the case when image pickup apparatus is in wide-angle position, FIG. 8B corresponds to the case when image pickup apparatus is in the middle position, and FIG. 8C corresponds to the case when image pickup apparatus is in the telephoto position.

First, the arrangement of the image pickup apparatus which has the zoom lens for the first embodiment will be explained using FIGS. 6A, 6B, and 6C. The image pickup apparatus which has the zoom lens for the present embodiment comprises, in order from the object side, an aperture member A, a first lens unit $G_1$ with positive refractive power, a flare stop F, a second lens unit $G_2$ with negative refractive power, an aperture stop S, a third lens unit $G_3$ with positive refractive power, a fourth lens unit $G_4$ with positive refractive power, and a CCD having an imaging plane IM, and the aperture member A, the first lens unit $G_1$, the flare stop F, the second lens unit $G_2$, the aperture stop S, the third lens unit $G_3$, the fourth lens unit $G_4$, and the CCD are arranged on an optical axis Lc. In addition, a plane plate-shaped low-pass filter LPF and a plane plate-shaped CCD cover grass CG are arranged in that order from the object side and between the fourth lens unit $G_4$ and the CCD.

The first lens unit $G_1$ comprises, in order from the object side, a lens $L_{11}$ which has negative refractive power and is a meniscus lens whose convex surface faces to the object side, and a lens $L_{12}$ which has positive refractive power and is a biconvex lens whose image side surface is aspherical. The lenses $L_{11}$ and $L_{12}$ are cemented together by cement.

The second lens unit $G_2$ comprises, in order from the object side, a lens $L_{21}$ which has negative refractive power and is a biconcave lens whose both surfaces are aspherical, a lens $L_{22}$ which has negative refractive power and is a meniscus lens whose convex surface faces to the image side, and a lens $L_{23}$ which has negative refractive power and is a biconcave lens whose image side surface is aspherical. The lenses $L_{22}$ and $L_{23}$ are cemented together by cement.

The third lens unit $G_3$ comprises, in order from the object side, a lens $L_{31}$ which has positive refractive power and is a biconvex lens whose image side surface is aspherical, a lens $L_{32}$ which has positive refractive power and is a biconvex lens, and a lens $L_{33}$ which has negative refractive power and is a biconcave lens. The lenses $L_{32}$ and $L_{33}$ are cemented together by cement.

The fourth lens unit $G_4$ comprises only a lens $L_4$ which has positive refractive power and is a biconvex lens whose both surfaces are aspherical.

In changing a magnification from the wide-angle position to the telephoto position, the first lens unit $G_1$ moves toward the object side on the optical axis Lc together with the aperture member A and the flare stop F. The second lens unit $G_2$ reciprocates on the optical axis Lc in such a way that the second lens unit $G_2$ first moves toward the object side with the distance between the first lens unit $G_1$ and the second lens unit $G_2$ being widened and then the second lens unit $G_2$ moves toward the image side. The third lens unit $G_3$ moves toward the object side on the optical axis Lc together with the aperture stop S with the distance between the second lens unit and $G_2$ the third lens unit $G_3$ being narrowed. The fourth lens unit $G_4$ reciprocates on the optical axis Lc in such a way that the fourth lens unit $G_4$ first moves toward the image side with the distance between the third lens unit $G_3$ and the fourth lens unit $G_4$ being widened and then the fourth lens unit $G_4$ moves toward the object side.

The lens arrangement and the numerical data to lenses composing each optical system in the first embodiment according to the present invention are as follows, where a unit of length used in the data is millimeter (mm):

| Surface data | | | | |
|---|---|---|---|---|
| Surface No. | (radius of curvature) R | (spacing between surfaces) D | (refractive index) Nd | (Abbe's number) νd |
| 1 (aperture member) | ∞ | 1.30 | | |
| 2 | 24.303 | 0.60 | 1.94595 | 17.98 |
| 3 | 20.278 | 0.01 | 1.56384 | 60.67 |
| 4 | 20.278 | 3.86 | 1.59201 | 67.02 |
| 5 (aspherical surface) | −83.332 | 0.00 | | |
| 6 (flare stop) | ∞ | D6 | | |
| 7 (aspherical surface) | −219.382 | 0.80 | 1.85135 | 40.10 |
| 8 (aspherical surface) | 7.253 | 2.75 | | |
| 9 | −48.761 | 1.82 | 1.94595 | 17.98 |
| 10 | −12.340 | 0.01 | 1.56384 | 60.67 |
| 11 | −12.340 | 0.70 | 1.77377 | 47.17 |
| 12 (aspherical surface) | 263.939 | D12 | | |
| 13 (aperture stop) | ∞ | 0.00 | | |
| 14 (aspherical surface) | 4.672 | 2.50 | 1.59201 | 67.02 |
| 15 (aspherical surface) | −25.291 | 0.10 | | |
| 16 | 8.562 | 1.70 | 1.49700 | 81.54 |
| 17 | −9.402 | 0.01 | 1.56384 | 60.67 |
| 18 | −9.402 | 0.42 | 1.62004 | 36.26 |
| 19 | 3.399 | D19 | | |
| 20 (aspherical surface) | 20.655 | 2.76 | 1.58313 | 59.38 |
| 21 (aspherical surface) | −14.163 | D21 | | |
| 22 | ∞ | 0.40 | 1.54771 | 62.84 |
| 23 | ∞ | 0.50 | | |
| 24 | ∞ | 0.50 | 1.51633 | 64.14 |
| 25 | ∞ | 0.37 | | |
| 26 (imaging plane) | ∞ | | | |

| Aspherical surface data | | |
|---|---|---|
| Surface No. | (radius of curvature) R | (conic constant) K |
| 5 | −83.332 | 0.000 |

| (aspherical coefficients) | | | | |
|---|---|---|---|---|
| $A_4$ | $A_6$ | $A_8$ | $A_{10}$ | $A_{12}$ |
| 1.01931e−05 | −1.99182e−08 | 2.10982e−10 | −1.07813e−12 | |

| Surface No. | (radius of curvature) R | (conic constant) K |
|---|---|---|
| 7 | −219.382 | 0.000 |

| (aspherical coefficients) | | | | |
|---|---|---|---|---|
| $A_4$ | $A_6$ | $A_8$ | $A_{10}$ | $A_{12}$ |
| −7.79808e−05 | −9.78436e−07 | 2.06198e−08 | 4.17971e−10 | −9.04989e−12 |

| Surface No. | (radius of curvature) R | (conic constant) K |
|---|---|---|
| 8 | 7.253 | 0.108 |

| (aspherical coefficients) | | | | |
|---|---|---|---|---|
| $A_4$ | $A_6$ | $A_8$ | $A_{10}$ | $A_{12}$ |
| 3.53561e−05 | 1.81435e−06 | −4.09283e−07 | 1.46449e−08 | −4.48012e−10 |

| Surface No. | (radius of curvature) R | (conic constant) K |
|---|---|---|
| 12 | 263.939 | −8.501 |

| (aspherical coefficients) | | | | |
|---|---|---|---|---|
| $A_4$ | $A_6$ | $A_8$ | $A_{10}$ | $A_{12}$ |
| −2.84161e−04 | −3.58819e−06 | 2.07140e−07 | | |

-continued

| Surface No. | (radius of curvature) R | (conic constant) K |
|---|---|---|
| 14 | 4.672 | 0.000 |

(asperical coefficients)

| $A_4$ | $A_6$ | $A_8$ | $A_{10}$ | $A_{12}$ |
|---|---|---|---|---|
| −4.28460e−04 | 2.56408e−05 | −7.90463e−07 | 2.10375e−07 | 2.49609e−08 |

| Surface No. | (radius of curvature) R | (conic constant) K |
|---|---|---|
| 15 | −25.291 | 0.000 |

(asperical coefficients)

| $A_4$ | $A_6$ | $A_8$ | $A_{10}$ | $A_{12}$ |
|---|---|---|---|---|
| 1.14651e−03 | 7.78099e−05 | −4.88552e−06 | 1.20734e−06 | 3.25505e−08 |

| Surface No. | (radius of curvature) R | (conic constant) K |
|---|---|---|
| 20 | 20.655 | 2.172 |

(asperical coefficients)

| $A_4$ | $A_6$ | $A_8$ | $A_{10}$ | $A_{12}$ |
|---|---|---|---|---|
| 8.48827e−06 | 1.27088e−06 | −4.12476e−07 | 7.62650e−09 | |

| Surface No. | (radius of curvature) R | (conic constant) K |
|---|---|---|
| 21 | −14.163 | −0.705 |

(asperical coefficients)

| $A_4$ | $A_6$ | $A_8$ | $A_{10}$ | $A_{12}$ |
|---|---|---|---|---|
| 6.34913e−05 | −5.55093e−06 | −2.18822e−07 | 5.67198e−09 | |

Various data

| Zoom ratio | 9.60 | | |
|---|---|---|---|
| | Wide-angle position | Middle position | Telephoto position |
| Focal length | 5.12 | 15.93 | 49.16 |
| F-number | 3.29 | 5.49 | 6.00 |
| Angle of view | 79.91 | 27.16 | 9.03 |
| Image height | 3.62 | 3.87 | 3.88 |
| Total length of the zoom lens | 41.84 | 53.45 | 58.92 |
| back focus | 6.02 | 4.25 | 4.66 |
| D6 | 0.30 | 8.86 | 18.86 |
| D12 | 15.35 | 8.83 | 1.44 |
| D19 | 2.15 | 13.51 | 15.94 |
| D21 | 4.51 | 2.83 | 3.17 |

Lens unit data for the zoom lens

| Lens unit number | Object-side surface of a lens unit | Focal length |
|---|---|---|
| 1 | 2 | 35.31 |
| 2 | 7 | −7.62 |
| 3 | 14 | 11.31 |
| 4 | 20 | 14.84 |

Data regarding the above condition in the first embodiment

Condition (1) $((X_A/Y_A)/(X_F/Y_F) < 1.10)$: $(X_A/Y_A)/(X_F/Y_F) = 1.01$
Condition (2) $((X_I/Y_I)/(X_F/Y_F) < 1.10)$: $(X_I/Y_I)/(X_F/Y_F) = 1.00$
Condition (3) $(0.5 < fw/D < 1)$: $fw/D = 0.66$
Condition (4) $(4.5 < ft/fw < 50)$: $ft/fw = 9.60$

Second Embodiment

Figure 9A:
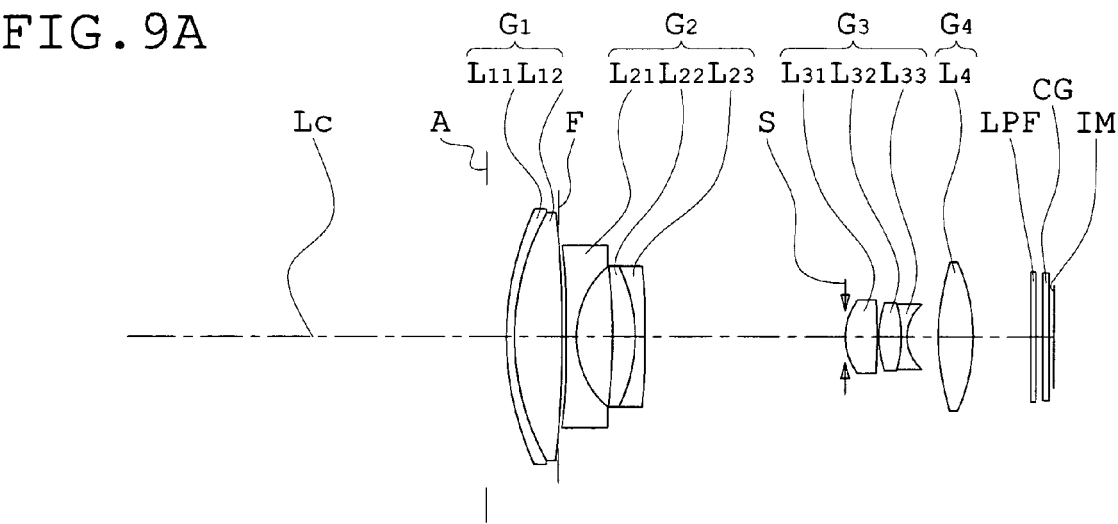
FIGS. 9A, 9B, and 9C are cross sectional views showing arrangements, developed along the optical axis, in wide-angle, middle, and telephoto positions, respectively, in infinite object point focusing of the zoom lens for a second embodiment of an image pickup apparatus according to the present invention.
Figure 9B:
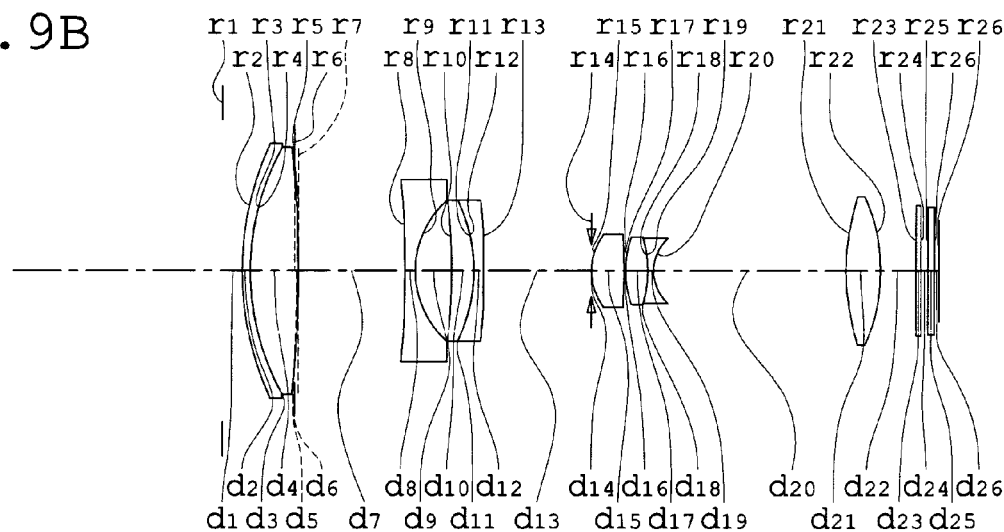
Figure 9C:
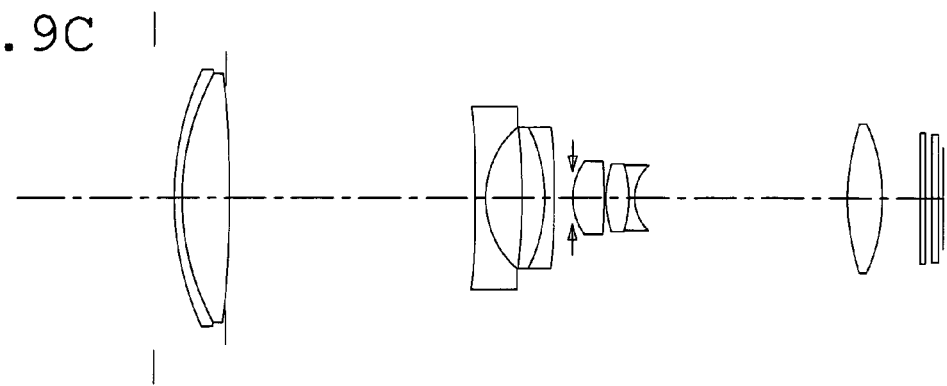
Figures 10A, 10B, 10C, 10D:
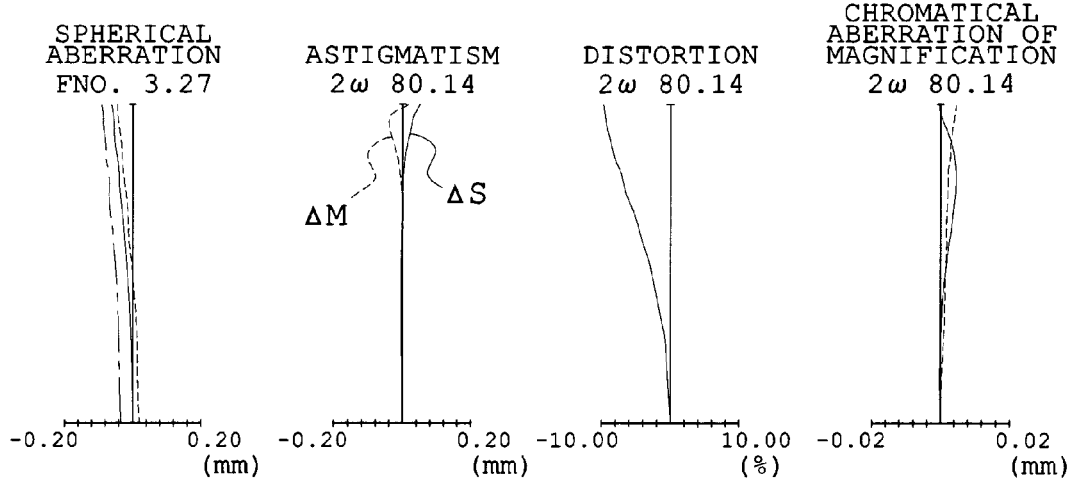
FIGS. 10A-10D, 10E-10H, and 10I-10L are diagrams showing aberration characteristics in wide-angle, middle, and telephoto positions, respectively, in infinite objective point focusing of the image pickup apparatus which has the zoom lens shown in FIG. 9A-9C.
Figures 10E, 10F, 10G, 10H:
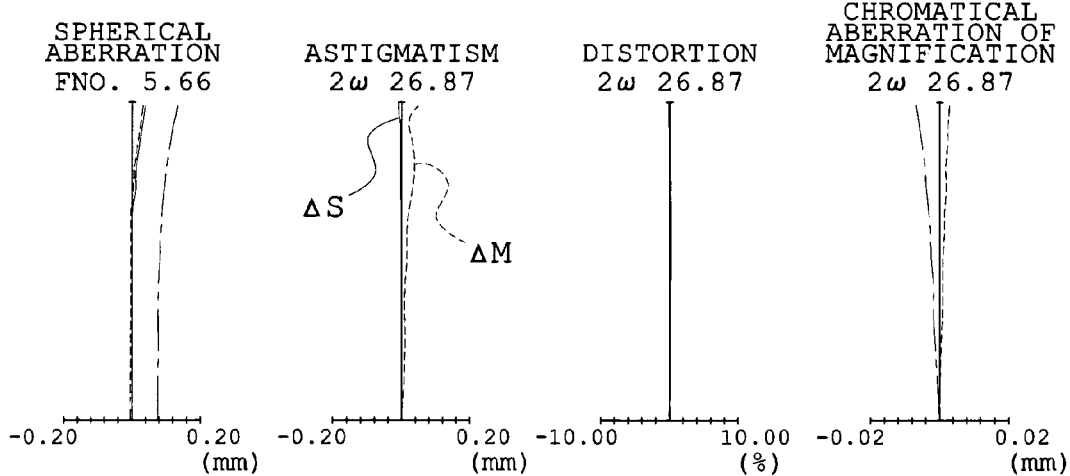
Figures 10I, 10J, 10K, 10L:
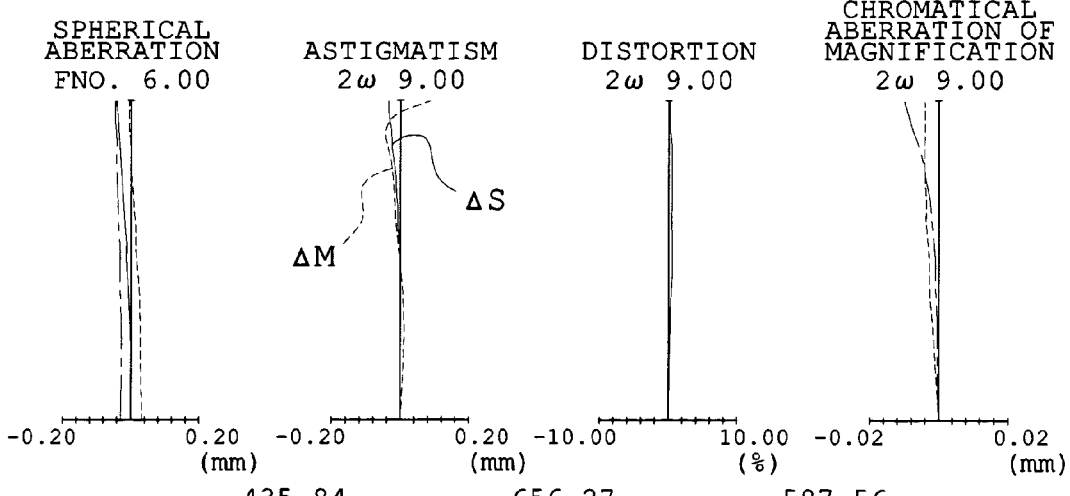
Figure 11A:
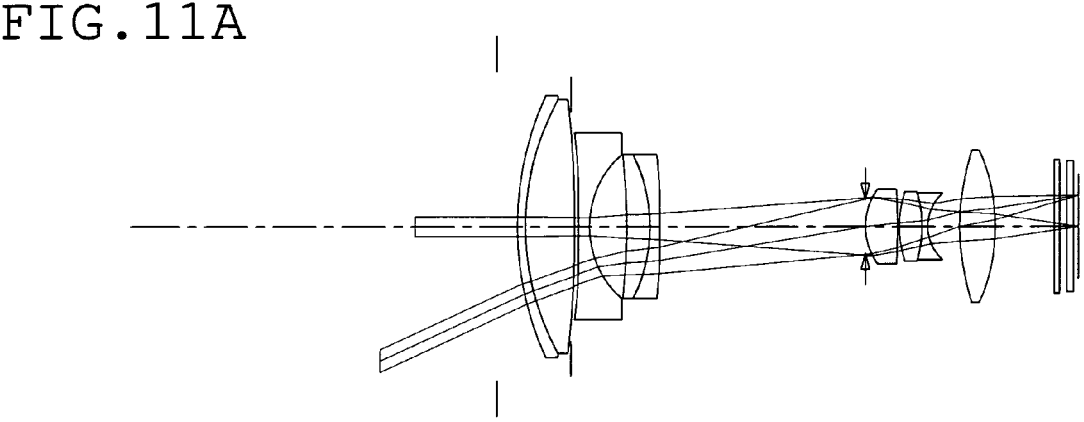
FIGS. 11A, 11B, and 11C are diagrams showing optical paths in the zoom lens shown in FIGS. 9A-9C, and FIGS. 10A-10D, 10E-10H, and 10I-10L in wide-angle, middle, and telephoto positions, respectively.
Figure 11B:
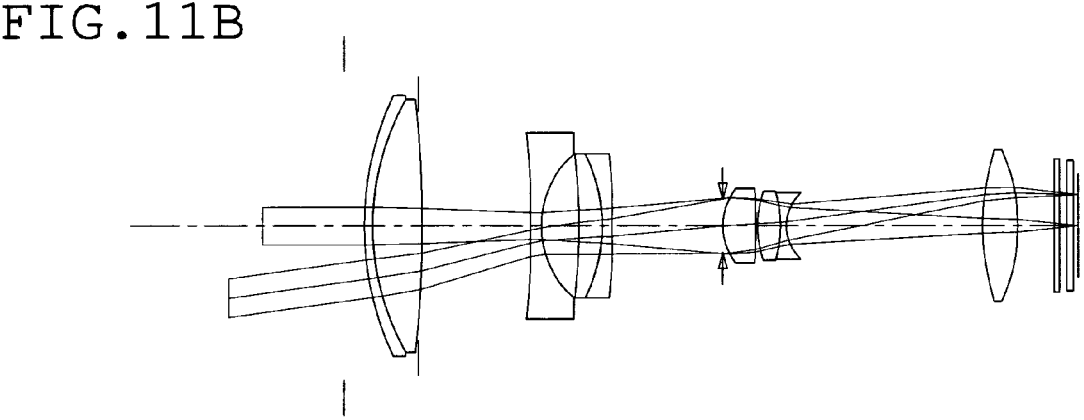
Figure 11C:
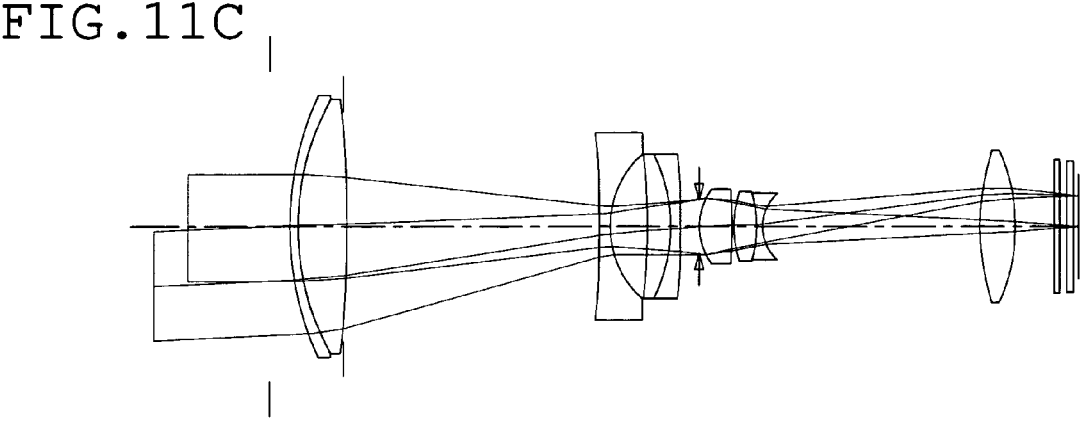

FIGS. 9A, 9B, and 9C are cross sectional views showing arrangements, developed along the optical axis, in infinite object point focusing of the zoom lens for the second embodiment of an image pickup apparatus according to the present invention. FIG. 9A corresponds to the case when the image pickup apparatus is in the wide-angle position, FIG. 9B corresponds to the case when the image pickup apparatus is in the middle position, and FIG. 9C corresponds to the case when the image pickup apparatus is in the telephoto position. FIGS. 10A-10D, 10E-10H, and 10I-10L are diagrams showing aberration characteristics in infinite objective point focusing of the image pickup apparatus which has the zoom lens shown in FIG. 9A-9C. FIGS. 10A-10D correspond to the case when the image pickup apparatus is in the wide-angle position, FIGS. 10E-10H correspond to the case when the image pickup apparatus is in the middle position, and FIGS. 10I-10L correspond to the case when the image pickup apparatus is in the telephoto position. FIGS. 11A, 11B, and 11C are diagrams showing optical paths in the zoom lens shown in FIG. 9A-9C, and FIGS. 10A-10D, 10E-10H, and 10I-10L. FIG. 11A corresponds to the case when the image pickup apparatus is in the wide-angle position, FIG. 11B corresponds to the case when the image pickup apparatus is in the middle position, and FIG. 11C corresponds to the case when the image pickup apparatus is in the telephoto position.

First, the arrangement of the image pickup apparatus having the zoom lens according to the second embodiment of the present invention will be explained using FIGS. 9A, 9B, and 9C. The image pickup apparatus having a zoom lens for the second embodiment of the present invention comprises, in order from the object side, an aperture member A, a first lens unit $G_1$ with positive refractive power, a flare stop F, a second lens unit $G_2$ with negative refractive power, an aperture stop S, a third lens unit $G_3$ with positive refractive power, a fourth lens unit $G_4$ with positive refractive power, and a CCD having an imaging plane IM, and the aperture member A, the first lens unit $G_1$, the flare stop F, the second lens unit $G_2$, the aperture stop S, the third lens unit $G_3$, a fourth lens unit $G_4$, and the CCD are arranged on an optical axis Lc. In addition, a plane plate-shaped low-pass filter LPF and a plane plate-shaped CCD cover grass CG are arranged in that order from the object side and between the fourth lens unit $G_4$ and the CCD.

The first lens unit $G_1$ comprises, in order from the object side, a lens $L_{11}$ which has negative refractive power and is a meniscus lens whose convex surface faces to the object side, and a lens $L_{12}$ which has positive refractive power and is a biconvex lens whose image side surface is aspherical. The lenses $L_{11}$ and $L_{12}$ are cemented together by cement.

The second lens unit $G_2$ comprises, in order from the object side, a lens $L_{21}$ which has negative refractive power and is a biconcave lens whose both surfaces are aspherical, a lens $L_{22}$ which has negative refractive power and is a meniscus lens whose convex surface faces to the image side, and a lens $L_{23}$ which has negative refractive power and is a biconcave lens whose image side surface is aspherical. The lenses $L_{22}$ and $L_{23}$ are cemented together by cement.

The third lens unit $G_3$ comprises, in order from the object side, a lens $L_{31}$ which has positive refractive power and is a biconvex lens whose image side surface is aspherical, a lens $L_{32}$ which has positive refractive power and is a biconvex lens, and a lens $L_{33}$ which has negative refractive power and is a biconcave lens. The lenses $L_{32}$ and $L_{33}$ are cemented together by cement.

The fourth lens unit $G_4$ comprises only a lens $L_4$ which has positive refractive power and is a biconvex lens whose both surfaces are aspherical.

In changing a magnification from the wide-angle position to the telephoto position, the first lens unit $G_1$ moves toward the object side on the optical axis Lc together with the aperture member A and the flare stop F. The second lens unit $G_2$ reciprocates on the optical axis Lc in such a way that the second lens unit $G_2$ first moves toward the object side with the distance between the first lens unit $G_1$ and the second lens unit $G_2$ being widened and then the second lens unit $G_2$ moves toward the image side. The third lens unit $G_3$ moves toward the object side on the optical axis Lc together with the aperture stop S with the distance between the second lens unit and $G_2$ the third lens unit $G_3$ being narrowed. The fourth lens unit $G_4$ reciprocates on the optical axis Lc in such a way that the fourth lens unit $G_4$ first moves toward the image side with the distance between the third lens unit $G_3$ and the fourth lens unit $G_4$ being widened and then the fourth lens unit $G_4$ moves toward the object side.

The flare stop F is arranged in such a way that the plane of the flare stop F is located between a position of the apex of the image side surface of the lens $L_{12}$ which is the most image side lens in the first lens unit $G_1$ and a position of outer edge of the image side surface of the lens $L_{12}$ on the optical axis.

The lens arrangement and the numerical data to lenses composing each optical system in the second embodiment according to the present invention are as follows, where a unit of length used in the data is millimeter (mm):

| Surface No. | (radius of curvature) R | (spacing between surfaces) D | (refractive index) Nd | (Abbe's number) vd |
|---|---|---|---|---|
| 1 (aperture member) | ∞ | 1.50 | | |
| 2 | 23.990 | 0.60 | 1.94595 | 17.98 |
| 3 | 20.014 | 0.01 | 1.56384 | 60.67 |
| 4 | 20.014 | 3.61 | 1.59201 | 67.02 |
| 5 (aspherical surface) | −81.633 | −0.28 | | |
| 6 (flare stop) | ∞ | 0.28 | | |
| 7 | ∞ | D7 | | |
| 8 (aspherical surface) | −119.663 | 0.80 | 1.85135 | 40.10 |
| 9 (aspherical surface) | 7.135 | 2.77 | | |
| 10 | −49.115 | 1.72 | 1.94595 | 17.98 |
| 11 | −12.221 | 0.01 | 1.56384 | 60.67 |
| 12 | −12.221 | 0.70 | 1.77377 | 47.17 |
| 13 (aspherical surface) | 1391.402 | D13 | | |
| 14 (aperture stop) | ∞ | 0.00 | | |
| 15 (aspherical surface) | 4.647 | 2.44 | 1.59201 | 67.02 |
| 16 (aspherical surface) | −25.229 | 0.10 | | |
| 17 (aspherical surface) | 8.387 | 1.69 | 1.49700 | 81.54 |
| 18 | −9.072 | 0.01 | 1.56384 | 60.67 |
| 19 | −9.072 | 0.41 | 1.62004 | 36.26 |
| 20 | 3.398 | D20 | | |
| 21 (aspherical surface) | 17.586 | 2.64 | 1.53113 | 55.80 |
| 22 (aspherical surface) | −13.846 | D23 | | |
| 23 | ∞ | 0.40 | 1.54771 | 62.84 |
| 24 | ∞ | 0.50 | | |
| 25 | ∞ | 0.50 | 1.51633 | 64.14 |
| 26 | ∞ | 0.37 | | |
| 27 (imaging plane) | ∞ | | | | where the spacing between surfaces in the Surface No. 5 is a distance from the surface having the Surface No. 5 which is the image side surface of the most image side lens in the first lens unit to the surface having the Surface No. 6 which is the flare stop, and the spacing between surfaces in the Surface No. 6 is a distance from the surface having the Surface No. 6 which is the flare stop to the surface having the Surface No. 7 (the Surface No. 5) which is the image side surface of the most image side lens in the first lens unit.

| Aspherical surface data | | | | |
|---|---|---|---|---|
| Surface No. | | (radius of curvature) R | | (conic constant) K |
| 5 | | −81.633 | | 0.000 |

| (asperical coefficients) | | | | |
|---|---|---|---|---|
| $A_4$ | $A_6$ | $A_8$ | $A_{10}$ | $A_{12}$ |
| 1.07975e−05 | −2.33198e−08 | 2.23143e−10 | −1.11486e−12 | |

| Surface No. | | (radius of curvature) R | | (conic constant) K |
|---|---|---|---|---|
| 8 | | −119.663 | | 0.000 |

| (asperical coefficients) | | | | |
|---|---|---|---|---|
| $A_4$ | $A_6$ | $A_8$ | $A_{10}$ | $A_{12}$ |
| 6.97736e−06 | −1.51633e−06 | −6.73939e−09 | 1.12137e−09 | −1.53525e−11 |

| Surface No. | | (radius of curvature) R | | (conic constant) K |
|---|---|---|---|---|
| 9 | | 7.135 | | 0.000 |

| (asperical coefficients) | | | | |
|---|---|---|---|---|
| $A_4$ | $A_6$ | $A_8$ | $A_{10}$ | $A_{12}$ |
| 1.61852e−04 | 5.23127e−06 | −1.40862e−07 | 4.39299e−09 | −4.10602e−10 |

| Surface No. | | (radius of curvature) R | | (conic constant) K |
|---|---|---|---|---|
| 13 | | 1391.402 | | 0.000 |

| (asperical coefficients) | | | | |
|---|---|---|---|---|
| $A_4$ | $A_6$ | $A_8$ | $A_{10}$ | $A_{12}$ |
| −2.83385e−04 | −5.68516e−06 | 8.44218e−08 | 1.07571e−08 | −2.27133e−10 |

| Surface No. | | (radius of curvature) R | | (conic constant) K |
|---|---|---|---|---|
| 15 | | 4.672 | | 0.000 |

| (asperical coefficients) | | | | |
|---|---|---|---|---|
| $A_4$ | $A_6$ | $A_8$ | $A_{10}$ | $A_{12}$ |
| −3.57433e−04 | 1.75624e−05 | 1.81288e−06 | −5.08442e−09 | 4.08679e−08 |

| Surface No. | | (radius of curvature) R | | (conic constant) K |
|---|---|---|---|---|
| 16 | | −25.229 | | 0.000 |

| (asperical coefficients) | | | | |
|---|---|---|---|---|
| $A_4$ | $A_6$ | $A_8$ | $A_{10}$ | $A_{12}$ |
| 1.26421e−03 | 5.98140e−05 | 3.66397e−06 | 6.18940e−09 | 1.23571e−07 |

| Surface No. | | (radius of curvature) R | | (conic constant) K |
|---|---|---|---|---|
| 21 | | 17.586 | | 1.000 |

| (asperical coefficients) | | | | |
|---|---|---|---|---|
| $A_4$ | $A_6$ | $A_8$ | $A_{10}$ | $A_{12}$ |
| 7.35861e−05 | 4.19366e−06 | −1.25570e−06 | 6.02317e−08 | −9.47479e−10 |

| Surface No. | | (radius of curvature) R | | (conic constant) K |
|---|---|---|---|---|
| 22 | | −13.846 | | −0.664 |

-continued (asperical coefficients)

| $A_4$ | $A_6$ | $A_8$ | $A_{10}$ | $A_{12}$ |
|---|---|---|---|---|
| 1.69596e−04 | −1.68121e−05 | 2.77678e−07 | −2.47101e−09 | 1.25457e−10 |

Various data

| Zoom ratio | | 9.61 | |
|---|---|---|---|
| | Wide-angle position | Middle position | Telephoto position |
| Focal length | 5.06 | 16.07 | 48.63 |
| F-number | 3.27 | 5.66 | 6.00 |
| Angle of view | 80.14 | 26.87 | 9.00 |
| Image height | 3.56 | 3.82 | 3.82 |
| Total length of the zoom lens | 41.14 | 52.33 | 57.90 |
| back focus | 5.87 | 4.12 | 4.37 |
| D7 | 0.30 | 8.03 | 18.61 |
| D13 | 15.14 | 8.21 | 1.38 |
| D20 | 2.33 | 14.48 | 16.03 |
| D22 | 4.36 | 2.69 | 2.88 |

Lens unit data for the zoom lens

| Lens unit number | Object-side surface of a lens unit | Focal length |
|---|---|---|
| 1 | 2 | 34.77 |
| 2 | 8 | −7.53 |
| 3 | 15 | 11.16 |
| 4 | 21 | 15.02 |

Data regarding the above condition in the second embodiment

Condition (1) $((X_A/Y_A)/(X_F/Y_F) < 1.10)$: $(X_A/Y_A)/(X_F/Y_F) = 1.07$
Condition (2) $((X_1/Y_1)/(X_F/Y_F) < 1.10)$: $(X_1/Y_1)/(X_F/Y_F) = 1.05$
Condition (3) $(0.5 < fw/D < 1)$: $fw/D = 0.65$
Condition (4) $(4.5 < ft/fw < 50)$: $ft/fw = 9.61$ Shapes of the image pickup device, the opening section of the aperture member, and the opening section of the flare stop are not restricted to the approximate rectangular shape though the shapes are approximately rectangular in each of the above embodiments.

The image pickup apparatus according to the present invention may be made as described below.

The image pickup apparatus according to the present invention preferably comprises an image converting unit that converts image data obtained by the image pickup device into image data in which color discrepancies caused by chromatic aberration of magnification is corrected. The design of the image pickup apparatus having the image converting unit makes it possible to obtain a more better image by electrically correcting chromatic aberration of magnification in the zoom lens which the image pickup apparatus has.

Generally, a digital camera is designed in such a way that: the image of an object is resolved into images of a first primary color, a second primary color, and a third primary color; and a color image is reproduced by superimposing output signals of the images of three primary colors by operation processing. However, when there is chromatic aberration of magnification in a zoom lens, the image forming positions of the images of light of the second and third primary colors are off the image forming position of the image of light of the first primary color in the case when the first primary color image is considered a standard. In order to electronically correct chromatic aberration of magnification causing the color discrepancies, the amounts of differences of the image forming positions of the second and third primary color images from the image forming position of the first primary color image are found on the basis of the aberration information of the zoom lens in every pixel in advance, and then a coordinate transformation should be made in such a way that the image forming positions of the second and third primary color images are corrected in every pixel by the amounts of the differences from the image forming position of the first primary color image.

For example, when an image is composed of output signals of three primary colors of red (R), green (G), and blue (B), the amounts of differences of the image forming positions of the red (R) and blue (B) images from the image forming position of the green (G) image are found in every pixel, a coordinate transformation of a photographed image is made in such a way that the differences from the image forming position of the green (G) image disappear, and then the red (R) and blue (B) signals should be output.

Although chromatic aberration of magnification varies with zoom, focus, and diaphragm stop, the amounts of differences of the image forming positions of the second and third primary color images from the image forming position of the first primary color image should be written as correction data in a storage in every lens position (zoom, focus, and diaphragm stop). Reference to the correction data according to a zoom position makes it possible to output the second and third primary color signals in which the amounts of the differences from the first primary color signal are corrected.

The image pickup apparatus according to the present invention is preferably designed in such a way that focusing for a focus adjustment of the zoom lens is performed by the most image side lens unit in a plurality of the lens units composing the zoom lens. Low load is added to a motor in focusing because the lens unit which is arranged at such position has light lens weight. In addition, the total length does not change in focusing, a driving motor can be arranged inside a lens frame, and the lens frame can be downsized.

Although it is desirable that focusing is performed by the most image side lens unit as described above, focusing may be performed by another lens unit. In addition, focusing may be performed by a plurality of lens units. In this case, the focusing by the plurality of the lens units makes it possible to efficiently prevent deterioration in the performance of the image pickup apparatus by focusing. The focusing may be performed by moving the whole of the zoom lens or a part of the lenses of one lens unit.

The image pickup apparatus according to the present invention may be designed in such a way that shading of brightness in the periphery of an image is reduced by shifting a microlens of the CCD. For example, a design of the microlens of the CCD may be changed so as to be suited to an angle of incidence of light in each image height. In addition, the decreased amount in the periphery of an image may be corrected by imaging process.

The flare stop for the image pickup apparatus according to the present invention may be made as a part of the frame member or another member. In addition, the flare stop may be directly printed to an optical member to be made or may be made using paint, an adhesive seal, and so on. The flare stop may be designed to cut not only a harmful light beam but also a light beam such as coma flare in the periphery of an image.

Each lens of the zoom lens for the image pickup apparatus according to the present invention may be given an antireflection coat to reduce flare or ghost. In this case, it is desirable that each lens of the zoom lens is given multi-coating as antireflection coat in order to reduce flare or ghost more effectively. An infrared cut coat may be given not to a low-pass filter, but to the surfaces of each lens, a cover glass, and so on.

An antireflection coat is commonly given to a lens surface which is in contact with air in order to prevent occurrence of flare or ghost. On the other hand, a refractive index of cement on the cementing surface of a cemented lens is sufficiently higher than the refractive index of air. For this reason, it is rare that the cementing surface of the cemented lens is particularly given an antireflection coat because the reflectance of the cementing surface of the cemented lens is often as high as or lower than that of a single layer coat originally. However, if the cementing surface of the cemented lens is positively given an antireflective coat, flare or ghost can be more reduced and better image can be obtained.

In particular, high refractive index grass materials by which the high effect of correction for aberration is obtained have been popularized in recent years and have come to be often used in optical systems for cameras. However, when the high refractive index glass material is used for the cemented lens, reflection on the cementing surface ceases to be negligible. In this case, the application of the antireflection coat to the cementing surface is particularly effective.

Such effective use of the coat of the cementing surface is disclosed in each of Japanese patent Kokai Nos. Hei 2-27301, 2001-324676, 2005-92115 and U.S. Pat. No. 7,116,482. For the application of the coat, it is only necessary that a relatively high refractive index coating substance, such as $Ta_2O_5$, $TiO_2$, $Nb_2O_5$, $ZrO_2$, $HfO_2$, $CeO_2$, $SnO_2$, $In_2O_3$, $ZnO$, or $Y_2O_3$, or a relatively low refractive index coating substance, such as $MgF_2$, $SiO_2$, or $Al_2O$ is properly selected in accordance with the refractive index of a lens for a substrate and the refractive index of the cement and is set to a film thickness such as to satisfy a phase condition.

As a matter of course, the coat of the cementing surface, like the coating on a lens surface which is in contact with air, may be used as a multi-coating. In this case, a proper combination of a coat substance and a film thickness of each layer makes it possible to reduce reflectance more and to control the spectral characteristic and/or the angular characteristic of the reflectance.

What is claimed is:

1. An image pickup apparatus comprising, in order from an object side:
    an aperture member having an opening section;
    a zoom lens comprising a plurality of lens units, a magnification of the zoom lens being changed by a change of distances between the plurality of lens units; and
    an image pickup device,
    wherein a flare stop that has an opening section having a set shape is integrated with the most object-side lens unit in the plurality of the lens units,
    wherein, in a wide-angle position, the aperture member does not intercept a wide-angle-position maximum effective light beam and, in a telephoto position, the aperture member intercepts a part of a telephoto-position maximum effective light beam, and
    wherein, in the wide-angle position, the flare stop does not intercept the wide-angle-position maximum effective light beam having passed through the opening section of the aperture member and, in the telephoto position, the flare stop intercepts a light ray that is included in the telephoto-position maximum effective light beam before reaching the aperture member but that strikes an edge of the opening section of the aperture member to pass through the opening section of the aperture member as scattered,
    the wide-angle-position maximum effective light beam being defined as a collective of all possible image-forming light beams travelling through the zoom lens in the wide-angle position to be received on an effective image pickup area of the image pickup device where any interception by the aperture member or by the flare stop is not taken into account,
    the telephoto-position maximum effective light beam being defined as a collective of all possible image-forming light beams travelling through the zoom lens in the telephoto position to be received on the image pickup area of the image pickup device where any interception by the aperture member or by the flare stop is not taken into account.

2. The image pickup apparatus according to claim 1, wherein each of the opening section of the aperture member, the opening section of the flare stop, and the effective image pickup area of the image pickup device has an approximately rectangular shape and the following condition is satisfied:

$$(X_A/Y_A)/(X_F/Y_F)<1.10$$

where X-direction corresponds to a direction along a long side of the approximately rectangular shape of the effective image pickup area of the image pickup device, Y-direction corresponds to a direction perpendicular to the X-direction and along a short side of the approximately rectangular shape of the effective image pickup area of the image pickup device, $X_A$ denotes a maximum length of the opening section of the aperture member measured along the X-direction, $Y_A$ denotes a maximum length of the opening section of the aperture member measured along the Y-direction, $X_F$ denotes a maximum length of the opening section of the flare stop measured along the X-direction, and $Y_F$ denotes a maximum length of the opening section of the flare stop measured along the Y-direction.

3. The image pickup apparatus according to claim 1, wherein each of the opening section of the aperture member, the opening section of the flare stop, and the effective image pickup area of the image pickup device has an approximately rectangular shape and the following condition is satisfied:

$(X_I/Y_I)/(X_F/Y_F)<1.10$ where X-direction corresponds to a direction along a long side of the approximately rectangular shape of the effective image pickup area of the image pickup device, Y-direction corresponds to a direction perpendicular to the X-direction and along a short side of the approximately rectangular shape of the effective image pickup area of the image pickup device, $X_I$ denotes a maximum length of the effective image pickup area of the image pickup device measured along the X-direction, $Y_I$ denotes a maximum length of the effective image pickup area of the image pickup device measured along the Y-direction, $X_F$ denotes a maximum length of the opening section of the flare stop measured along the X-direction, and $Y_F$ denotes a maximum length of the opening section of the flare stop measured along the Y-direction.

4. The image pickup apparatus according to claim 2, wherein the following condition is satisfied:

$(X_I/Y_I)/(X_F/Y_F)<1.10$ where $X_I$ denotes a maximum length of the effective image pickup area of the image pickup device measured along the X-direction, and $Y_I$ denotes a maximum length of the effective image pickup area of the image pickup device measured along the Y-direction.

5. The image pickup apparatus according to claim 1, wherein the zoom lens comprises, in order from the object side, a first lens unit with positive refractive power, a second lens unit with negative refractive power, an aperture stop, and a third lens unit with positive refractive power, the image pickup device is a solid-state image pickup device, the flare stop and the first lens unit move integrally with each other in changing a magnification, and the zoom lens and the image pickup device satisfy the following conditions:

$0.5<fw/D<1$ $4.5<ft/fw<50$ where fw denotes a focal length in the wide-angle position of the zoom lens, ft denotes a focal length in the telephoto position of the zoom lens, and D denotes a diagonal length of the solid-state image pickup device.

6. The image pickup apparatus according to claim 2, wherein the zoom lens comprises, in order from the object side, a first lens unit with positive refractive power, a second lens unit with negative refractive power, an aperture stop, and a third lens unit with positive refractive power, the image pickup device is a solid-state image pickup device, the flare stop and the first lens unit move integrally with each other in changing a magnification, and the zoom lens and the image pickup device satisfy the following conditions:

$0.5<fw/D<1$ $4.5<ft/fw<50$ where fw denotes a focal length in the wide-angle position of the zoom lens, ft denotes a focal length in the telephoto position of the zoom lens, and D denotes a diagonal length of the solid-state image pickup device.

7. The image pickup apparatus according to claim 3, wherein the zoom lens comprises, in order from the object side, a first lens unit with positive refractive power, a second lens unit with negative refractive power, an aperture stop, and a third lens unit with positive refractive power, the image pickup device is a solid-state image pickup device, the flare stop and the first lens unit move integrally with each other in changing a magnification, and the zoom lens and the image pickup device satisfy the following conditions:

$0.5<fw/D<1$ $4.5<ft/fw<50$ where fw denotes a focal length in the wide-angle position of the zoom lens, ft denotes a focal length in the telephoto position of the zoom lens, and D denotes a diagonal length of the solid-state image pickup device.

8. The image pickup apparatus according to claim 4, wherein the zoom lens comprises, in order from the object side, a first lens unit with positive refractive power, a second lens unit with negative refractive power, an aperture stop, and a third lens unit with positive refractive power, the image pickup device is a solid-state image pickup device, the flare stop and the first lens unit move integrally with each other in changing a magnification, and the zoom lens and the image pickup device satisfy the following conditions:

$0.5<fw/D<1$ $4.5<ft/fw<50$ where fw denotes a focal length in the wide-angle position of the zoom lens, ft denotes a focal length in the telephoto position of the zoom lens, and D denotes a diagonal length of the solid-state image pickup device.

9. The image pickup apparatus according to claim 1, wherein, in the telephoto-position maximum effective light beam, a principal ray of an image-forming light beam convergent on an image point at a maximum image height is free from interception by the aperture member or by the flare stop.

10. The image pickup apparatus according to claim 2, wherein, in the telephoto-position maximum effective light beam, a principal ray of an image-forming light beam convergent on an image point at a maximum image height is free from interception by the aperture member or by the flare stop.

11. The image pickup apparatus according to claim 3, wherein, in the telephoto-position maximum effective light beam, a principal ray of an image-forming light beam convergent on an image point at a maximum image height is free from interception by the aperture member or by the flare stop.

12. The image pickup apparatus according to claim 4, wherein, in the telephoto-position maximum effective light beam, a principal ray of an image-forming light beam convergent on an image point at a maximum image height is free from interception by the aperture member or by the flare stop.

13. The image pickup apparatus according to claim 1, wherein distortion is corrected by image processing.

14. The image pickup apparatus according to claim 2, wherein distortion is corrected by image processing.

15. The image pickup apparatus according to claim 3, wherein distortion is corrected by image processing.

16. The image pickup apparatus according to claim 4, wherein distortion is corrected by image processing.

* * * * *